(12) United States Patent
Radwan et al.

(10) Patent No.: US 9,600,238 B2
(45) Date of Patent: Mar. 21, 2017

(54) FULLY DIGITAL CHAOTIC DIFFERENTIAL EQUATION-BASED SYSTEMS AND METHODS

(75) Inventors: Ahmed Gomaa Ahmed Radwan, Giza (EG); Mohammed Affan Zidan, Thuwal (SA); Khaled Nabil Salama, Thuwal (SA)

(73) Assignee: King Abdullah University of Science and Technology (KAUST), Thuwal (SA)

( * ) Notice: Subject to any disclaimer, the term of this patent is extended or adjusted under 35 U.S.C. 154(b) by 1239 days.

(21) Appl. No.: 13/408,388

(22) Filed: Feb. 29, 2012

(65) Prior Publication Data

US 2012/0226724 A1    Sep. 6, 2012

Related U.S. Application Data

(60) Provisional application No. 61/448,188, filed on Mar. 1, 2011.

(51) Int. Cl.
*G06F 7/58* (2006.01)
*H04L 9/00* (2006.01)
*H04L 9/06* (2006.01)

(52) U.S. Cl.
CPC .............. *G06F 7/588* (2013.01); *G06F 7/58* (2013.01); *G06F 7/586* (2013.01); *H04L 9/001* (2013.01); *H04L 9/0656* (2013.01)

(58) Field of Classification Search
CPC ....... H04L 9/001; H04L 9/065; H04L 9/0656; H04L 9/0662; H04L 9/0668; H04L 27/001; G06F 7/58–7/588
See application file for complete search history.

(56) References Cited

U.S. PATENT DOCUMENTS 5,258,936 A    11/1993 Gallup et al.
5,365,588 A    11/1994 Bianco et al.
(Continued)

FOREIGN PATENT DOCUMENTS

WO    02/47272    6/2002

OTHER PUBLICATIONS

Eguchi, K., Inoue, T. & Tsuneda, A., "Synthesis and analysis of a digital chaos circuit generating multiple-scroll strange attractors," IEICE Trans. Fund. E82-A, pp. 965-972, 1999.*

(Continued)

*Primary Examiner* — Matthew Sandifer
(74) *Attorney, Agent, or Firm* — Thomas | Horstemeyer LLP; Todd N. Deveau; Randy R. Schoen

(57) ABSTRACT

Various embodiments are provided for fully digital chaotic differential equation-based systems and methods. In one embodiment, among others, a digital circuit includes digital state registers and one or more digital logic modules configured to obtain a first value from two or more of the digital state registers; determine a second value based upon the obtained first values and a chaotic differential equation; and provide the second value to set a state of one of the plurality of digital state registers. In another embodiment, a digital circuit includes digital state registers, digital logic modules configured to obtain outputs from a subset of the digital shift registers and to provide the input based upon a chaotic differential equation for setting a state of at least one of the subset of digital shift registers, and a digital clock configured to provide a clock signal for operating the digital shift registers.

31 Claims, 20 Drawing Sheets

(56) References Cited

U.S. PATENT DOCUMENTS

| | | | |
|---|---|---|---|
| 5,735,741 | A | 4/1998 | Yamazaki et al. |
| 5,943,248 | A | 8/1999 | Clapp |
| 6,049,614 | A * | 4/2000 | Kim .............................. 380/263 |
| 8,644,362 | B1 * | 2/2014 | Lauer et al. ................... 375/141 |
| 2002/0154769 | A1 * | 10/2002 | Petersen et al. ................ 380/42 |
| 2003/0081769 | A1 | 5/2003 | Hamilton |
| 2004/0086117 | A1 * | 5/2004 | Petersen et al. ................ 380/44 |
| 2008/0263119 | A1 | 10/2008 | Chester et al. |
| 2009/0030659 | A1 | 1/2009 | Beckman et al. |

OTHER PUBLICATIONS

Lu and G. Chen, "Generating Multiscroll Chaotic Attractors: Theories, Methods and Applications", Int. J. Bifurc. Chaos, vol. 16, No. 4, 2006.*

R. Fitzpatrick, "Runge-Kutta Methods", course notes from "Computational Physics: An Introductory Course", University of Texas at Austin, 2009.*

J. Cernak, "Digital generators of chaos", Phys. Lett. A, vol. 214, pp. 151-160, 1996.*

S. Amini and A.L. Steele, "A digital chaos generator for use within chaos encrypted communication systems", 2nd International Workshop on Nonlinear Dynamics and Synchronization, 2009.*

P. Dabal and R. Pelka, "Implementation of digital chaos generators for cryptography applications in FPGA", Pomiary Automatyka Kontrola, No. 7, pp. 711-713, Jul. 2010.*

Linz, "Nonlinar dynamical models and jerky motion", American Journal of Physics, 65 (6), Jun. 1997.*

N. Brisebarre, F. de Dinechin, and J.-M. Muller, "Integer and floating-point constant multipliers for FPGAs," in Application-specific Systems, Architectures and Processors. IEEE, pp. 239-244, 2008.*

Wikipedia.org, "Lorenz Attractor", Feb. 2008, retrieved from https://web.archive.org/web/20080226013943/http://en.wikipedia.org/wiki/Lorenz_system.*

Electronics-Tutorials.ws, "The (Delay) D flip-flop and Data Latch", Jan. 2011, retrieved from https://web.archive.org/web/20110119145058/http://www.electronics-tutorials.ws/sequential/seq_4.html.*

L. De Micco, O. G. Zabaleta, C. M. Gonzlez, C. M. Arizmendi, and H. A. Larrondo, "Estocasticidad de un atractor catico determinista implementado en fpga," Proceedings Iberchip 2010, Feb. 2010 (including machine translation).*

C. M. Gonz'alez, H. A. Larrondo, C. A. Gayoso, and L. J. Arnone, "Generaci'on de secuencias binarias pseudo aleatorias por medio de un mapa ca'otico 3d," in Proceedings del IX Workshop de IBERCHIP, 2003 (including machine translation).*

De Micco, Luciana, and Hilda Larrondo, "FPGA implementation of a chaotic oscillator using RK4 method," 2011 VII Southern Conference on Programmable Logic (SPL), 2011.*

Sadoudi and M. S. Azzaz, "Hardware implementation of the Rössler chaotic system for securing chaotic communication", Proc. 5th Int. Conf.: Sciences of Electronic, Technologies of Information and Telecommunications, 2009.*

Sprott, "Complex Behavior of Simple Systems", Unifying Themes in Complex Systems IIIB, 3-11 (2006).*

M. Azzaz, C. Tanougast, S. Sadoudi, and A. Dandache, "Real-time fpga implementation of lorenz's chaotic generator for ciphering telecommunications," Joint IEEE North-East Workshop on Circuits and Systems and TAISA Conference, 2009.*

M. A. Aseeri, M. I. Sobhy, and P. Lee, "Lorenz chaotic model using filed programmable gate array (fpga)," 45th Midwest Symposium on Circuits and Systems, vol. 1, No. I, pp. 527-530, 2002.*

International Application No. PCT/IB2012/000377, filed on Feb. 29, 2012, International Search Report and Written Opinion of Sep. 17, 2012.

International Application No. PCT/IB2012/000377, filed on Feb. 29, 2012, International Preliminary Report on Patentability of Nov. 5, 2013.

"Chaos in a simple electronic circuit" by G. Prakash and K. Mika, Proc. of National Conference on Nonlinear Systems & Dynamics, pp. 325-328, Dec. 2003.

EP Application No. EP12752689.5, filed Feb. 29, 2012, Supplementary European Search Report of Aug. 2014.

EP Application No. EP12752689.5, filed Feb. 29, 2012, Response to Supplementary European Search Report of Aug. 2014.

"Random No. generation based on digital differential chaos" by Zidan et al., IEEE 54th International Midwest Symposium on Circuits and Systems, Aug. 2011.

"Controllable V-shape multi-scroll butterfly attractor: system and circuit implementation" by Zidan et al., International Journal of Bifurcation and Chaos, vol. 22, No. 6, Jun. 2012.

EP Application No. EP12752689.5, filed Feb. 29, 2012, Letters Patent of Apr. 2015.

* cited by examiner

FULLY DIGITAL CHAOTIC DIFFERENTIAL EQUATION-BASED SYSTEMS AND METHODS

CROSS REFERENCE TO RELATED APPLICATIONS

This application claims priority to U.S. provisional application entitled "FULLY DIGITAL CHAOTIC DIFFERENTIAL EQUATION-BASED SYSTEMS AND METHODS" having Ser. No. 61/448,188, filed Mar. 1, 2011, the entirety of which is hereby incorporated by reference.

BACKGROUND

Chaos is a nonlinear deterministic system that expresses random behavior. Many analog chaos generators have been introduced in the last decades. The implementation of these generators ranges from using discrete elements and op-amps to completely MOS based systems up to fully integrated analog systems.

Analog chaos generators and other analog chaotic systems have found applications in communication systems and cryptography. For example, an analog chaos generator is a key component in a chaos-based communication system using chaos shift keying (CSK). Also an analog chaos circuit realization is considered to be one of the main techniques of creating a random number generator (RNG). Additionally, analog chaos circuitry may be used in amplification of a noise source, jittered oscillator sampling, and quantum based systems.

SUMMARY

Embodiments of the present disclosure are related to fully digital chaotic differential equation-based systems and methods. One embodiment, among others, includes a fully digital differential equation-based chaos generator made-up of adders, registers and basic gates. Embodiments of the generator fit in a very small on-chip area and express a high throughput. Post-processing techniques may be combined with the chaos properties to improve the output statistical properties. With the aid of the introduced post-processing, the system output can pass the fifteen NIST Sp. 800-22 tests with a 100% success rate.

In certain embodiments, the fully digital differential equation-based chaos generator may be used to implement a Random Number Generation (RNG), histogram shaping, watermarking and image encryption, data hiding, and/or coding. In other embodiments, the generator may be used to implement digital communication systems and methods such as Chaos Based Digital Modulation and Demodulation Techniques (e.g., CSK), differential CSK, frequency modulated DCSK, symmetric CSK, quadrature CSK, and/or chaotic pulse-position modulation.

In one embodiment, among others, a digital circuit comprises a plurality of digital state registers and one or more digital logic modules coupled to the plurality of digital state registers, each of the one or more digital logic modules configured to: obtain a first value from two or more of the plurality of digital state registers; determine a second value based upon the obtained first values and a chaotic differential equation; and provide the second value to set a state of one of the two or more of the plurality of digital state registers. The digital logic modules may be configured to determine the corresponding second values according to a Runge-Kutta Fourth-order numerical solution, a mid-point numerical solution, or an Euler numerical solution to the chaotic differential equation. The digital circuit may further comprise a post-processing module configured to discard a highest significant bit of at least one of the second values, discard a lowest significant bit of the at least one second values, and/or combine the state of the plurality of digital state registers to generate a single random output. In some embodiments, an apparatus comprises a first digital circuit that is configured to provide second values with a length of 16-bits and a second digital circuit that is configured to provide second values with a length of 32-bits. A second value of the first digital circuit and a corresponding second value of the second digital circuit may be combined to generate a single random output.

In another embodiment, a digital circuit comprises a plurality of digital state registers, each digital shift register configured to obtain an input and provide an output; a plurality of digital logic modules, each digital logic module configured to obtain outputs from a subset of two or more of the plurality of digital shift registers and to provide the input for setting a state of at least one of the subset of digital shift registers, the plurality of digital logic modules each configured to provide the input according to a portion of a numeric solution to a chaotic differential equation; and a digital clock configured to provide a digital clock signal for operating the plurality of digital shift registers. The plurality of digital shift registers may be the plurality of digital shift registers are configured to obtain the input from one of the plurality of digital logic modules on a second clock edge of the digital clock signal. The plurality of digital shift registers may be configured to provide the output to one or more of the plurality of digital logic modules on a first clock edge of the digital clock signal. The digital circuit may further comprise a digital post-processing module configured to generate a chaotic output in response to the inputs received by each of the plurality of digital shift registers. The post-processing module may be configured to combine the state of the plurality of digital state registers to generate a single random output.

In another embodiment, a method comprises receiving a clock signal having a first clock state and a second clock state; obtaining first values from a subset of a plurality of digital state registers by each of a plurality of digital logic modules when the clock signal enters the first clock state; transforming the first values in each of the plurality of digital logic modules into a corresponding second value based upon a numerical solution to one or more chaotic differential equations; and writing the corresponding second values into a corresponding on of the plurality of digital state registers when the clock signal enters the second clock state. The method may further comprise providing at least one of the corresponding second values as a random number output. The method may further comprise combining a plurality of the corresponding second values to form the random number output.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
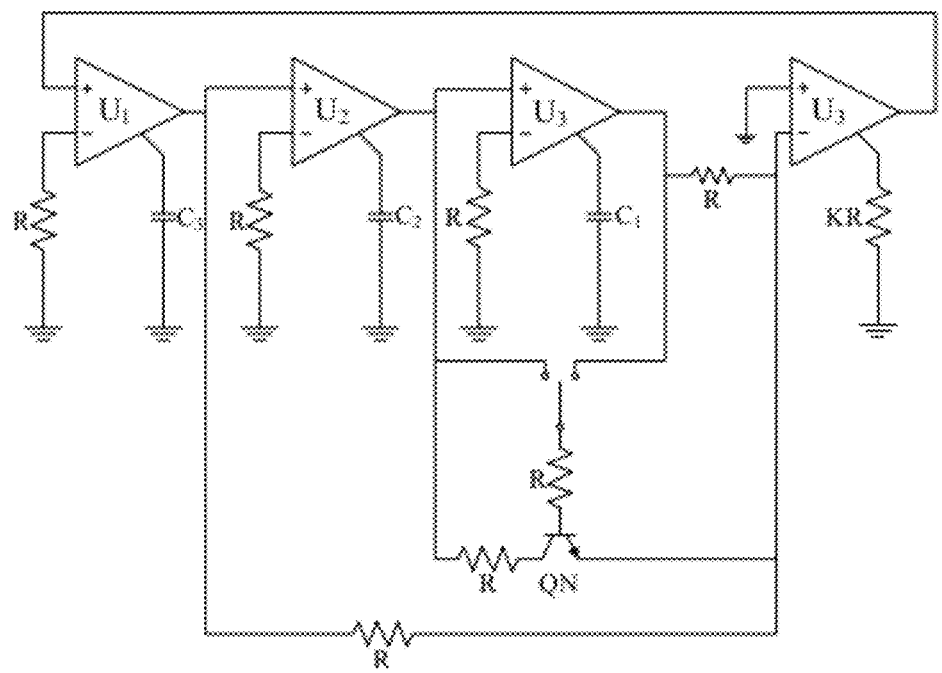
FIG. 1A is a circuit diagram illustrating an example of an analog realization of a chaos generator using four op-amps with capacitors of 1 nF.

Disclosed herein are various embodiments related to digital chaotic differential equation-based systems and methods. For example, embodiments of a fully digital chaotic differential equation-based random number generator (RNG) are presented. As another example, embodiments of a fully digital chaotic differential equation-based Lorenz butterfly chaotic attractor are presented. Reference will now be made in detail to the description of the embodiments as illustrated in the drawings, wherein like reference numbers indicate like parts throughout the several views.

Many analog-based realizations for chaotic behavior as a RNG are known. For example, some analog-based realizations may include discrete chaotic mapping or Chua's double scroll attractor. Hyperbolic tangent functions are typically used as a nonlinear element of the analog-based generators.

The analog chaos generators are typically sensitive to external factors. For example, analog chaos generators may be sensitive to running conditions, process variations, or high operating temperatures. In addition, initial conditions cannot always be set precisely in an analog-based generator. Analog-based chaotic circuits also typically require a relatively large on-chip area for the state capacitors realization. On the other hand, a digital implementation has many advantages such as, e.g., a very small integrated area for high throughput, no capacitors or inductors are needed, initial conditions are set precisely, simple controllability, portability (working in the same way in different environments conditions), repeatability (having the ability of reproducing exactly the same sequence as many times as required), improved reliability, and wide noise margins.

A chaos generator may be described as one of the simplest realizations for a chaotic behavior, from the analog point of view, by the following differential equation, $$-\dddot{X} = \ddot{X} + B\dot{X} + X \qquad \text{EQN. 1}$$

where the nonlinear element is defined as, $$B(X) = \begin{cases} a, & X \geq 1 \\ 0, & X < 1 \end{cases} \qquad \text{EQN. 2}$$

Figure 1B:
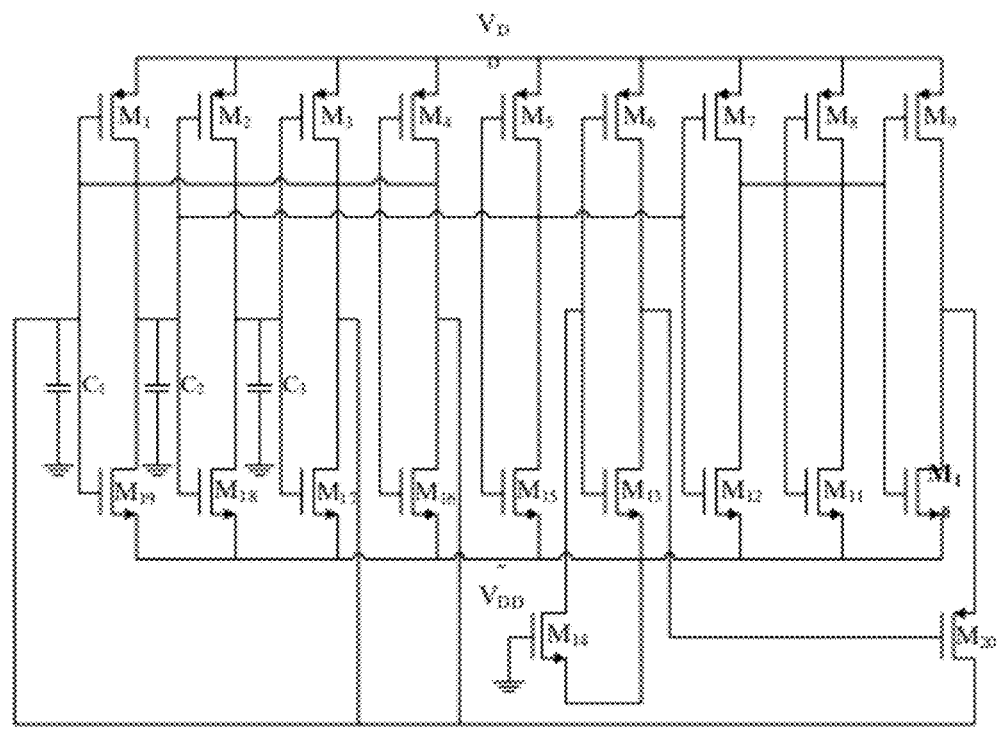
FIG. 1B is a circuit diagram illustrating an example of an analog realization of a chaos generator using 20 MOS transistors with capacitors of 50 nF.

Although this example is relativity simple compared with other chaos generators, its analog implementation is still considered very large relative to the proposed digital realizations in the present disclosure. FIGS. 1A and 1B show analog realizations of the chaotic system of EQN. 1. The realization of FIG. 1A includes three large 1 nF capacitors, four operational amplifiers and many resistances, while a MOS realization shown in FIG. 1B includes 20 large transistors and three huge 50 nF capacitors.

Because chaotic systems are used in digital systems, the outputs of an analog chaos generator circuit are sometimes digitized. These systems use even more on-chip area, or external analog-to-digital (A/D) converters, which tends to reduce the efficiency and increase the cost and size of the analog chaos generator circuits. Also, tolerances in practical implementations of the chaos circuits remarkably decrease the quality of the output (Entropy). As a result of these drawbacks, many theoretically useful properties of RNGs such as, efficiency, repeatability, portability, cannot be achieved using an analog-based circuit realization.

In the present disclosure, a fully digital implementation of this generator is introduced. Digital realizations may also be implemented for many of the other more complicated analog generators.

I. Digital Realization

A differential equation-based chaos generator may be digitally implemented by realizing the numerical solution of its differential equation. For the EQN. 1, which simply describes a chaotic behavior, let $Y=\dot{X}$ and $Z=\ddot{X}$. Such a relationship can be solved numerically using any numerical technique, e.g., using an Euler method, such that, $$X_{t+h}=F(X,Y)=X_t+hY_t \qquad \text{EQN. 3}$$

$$Y_{t+h}=G(Y,Z)=Y_t+hZ_t \qquad \text{EQN. 4}$$

$$Z_{t+h}=H(X,Y,Z)=Z_t-h(Z_t+Y_tB(Y_t)+X_1) \qquad \text{EQN. 5}$$

where t expresses the time and h is the time step.

Figure 2:
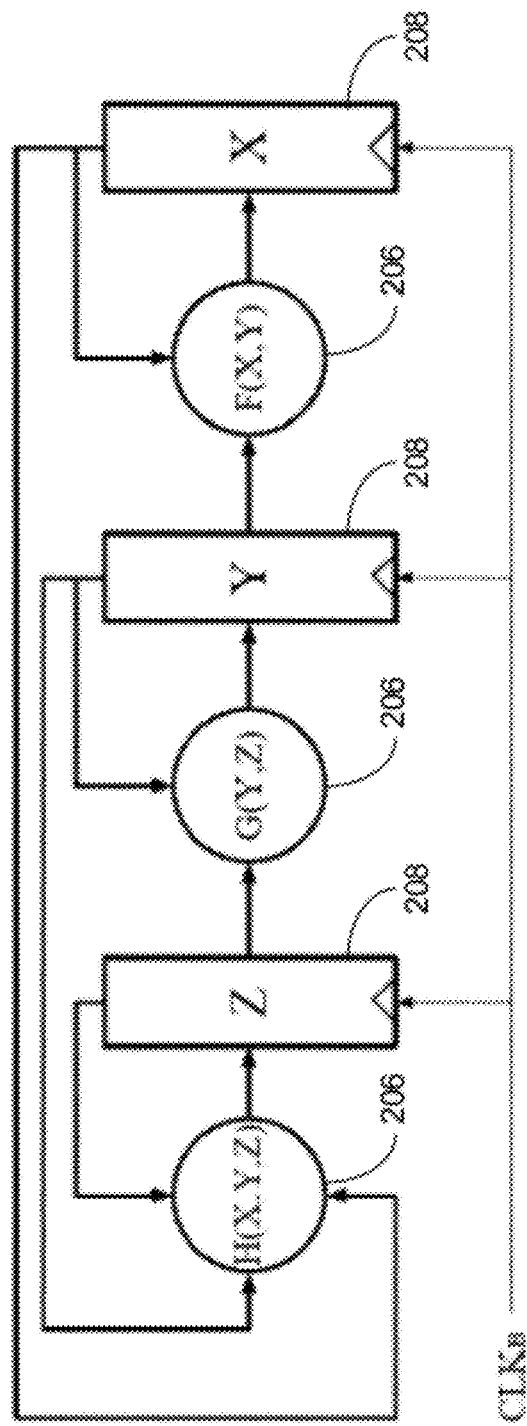
FIG. 2 is a schematic block diagram illustrating an example of a digital realization of a chaos generator for generating a chaotic output in accordance with various embodiments of the present disclosure.

Referring to FIG. 2, shown is an example of a fully digital realization of a chaos generator based upon EQNS. 3-5 using a simple register transfer module. In the example of FIG. 2, the state variables X, Y and Z are implemented as registers 208, rather than capacitors as in the analog realizations (which have several drawbacks that make them unsuitable for many applications that would benefit from an all-digital implementation such as, e.g., an RNG). In the example of FIG. 2, each of the EQNS. 3-5 is realized as a combinational functional unit (also referred to herein as a digital logic module) 206. Such a digital implementation may be interpreted as a nonlinear extension of linear feed-back shift registers. Since the generator output is chaotic, the period of the output repetition reaches infinity with an efficient digital implementation.

Figure 3:
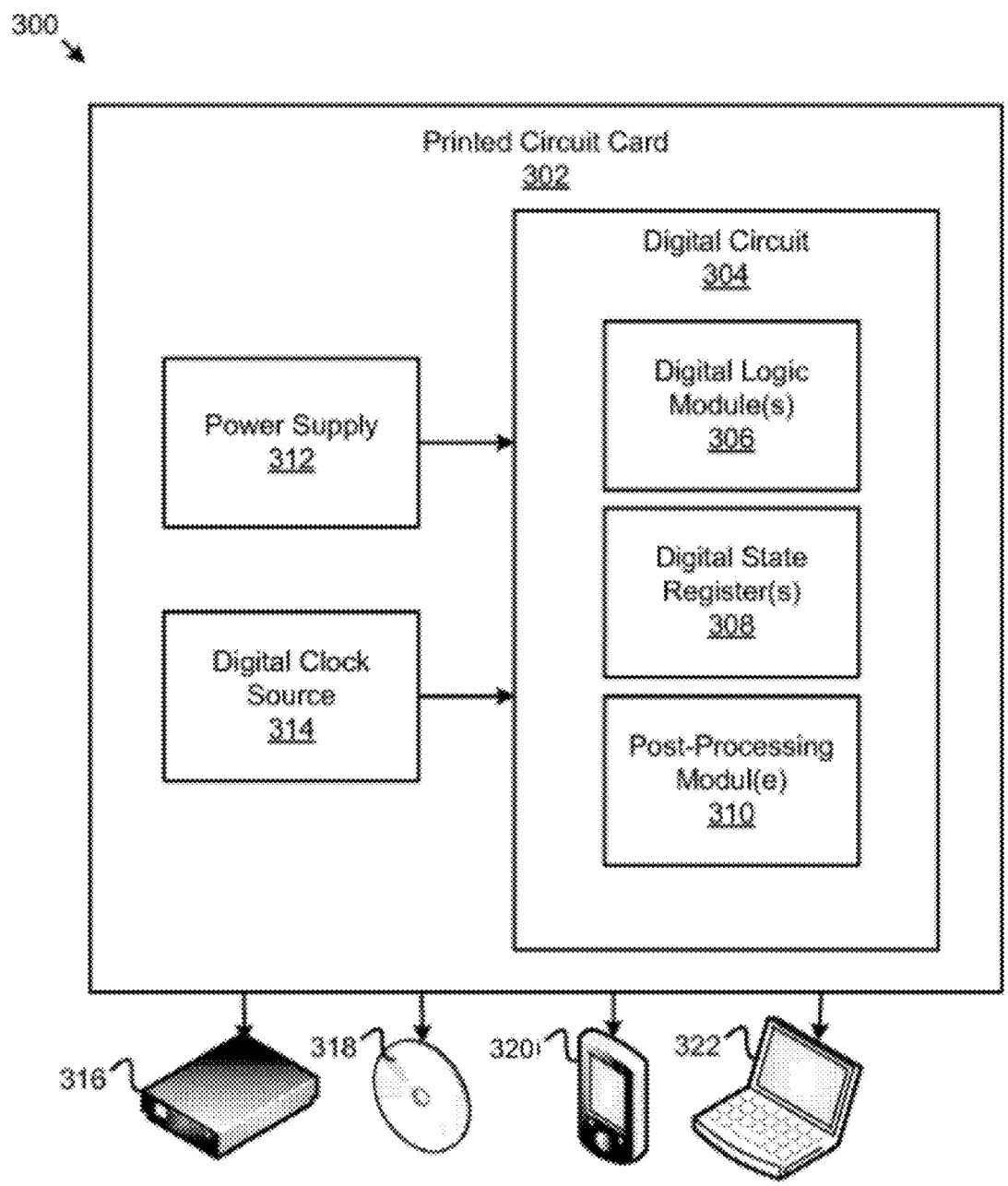
FIG. 3 is a graphical representation of an example of a system or apparatus that includes a chaos generator such as in FIG. 2 in accordance with various embodiments of the present disclosure.

Referring next to FIG. 3, shown is a graphical representation of a system or apparatus 300 that is suitable for generating a fully digital chaotic output. The system or apparatus 300 includes a digital circuit 304, a circuit card 302 coupled to the digital circuit 304, and a power supply 312 coupled to the circuit card 302. While the example of FIG. 3 illustrates the digital circuit 304 mounted on the circuit card 302, in other implementations the digital circuit 304 may be included in a system on a chip (SoC) or other appropriate implementation. In such an embodiment, the digital circuit 304 may include a plurality of digital state registers 308, and one or more digital logic modules 306 coupled to the plurality of digital state registers 308. The one or more digital logic modules 306 are configured to receive a first value from two or more of the plurality of digital state registers 308 and return a second value to the one or more digital state registers 308, the second value determined with logic in the digital logic modules 306 configured according to a numerical function equivalent of a chaotic differential equation.

For example, in one embodiment for implementing the fully digital realization of FIG. 2, a digital circuit 304 for generating a chaotic output includes a plurality of digital state registers 308, and one or more digital logic modules 306 coupled to the plurality of digital state registers 308. The one or more digital logic modules 306 may receive a first value from each of two or more of the plurality of digital state registers 308 and set a second value in one of the two or more of the plurality of digital state registers 308, the second value determined by logic in the digital logic modules 306 configured according to a numerical solution to a chaotic differential equation.

In another embodiment, the digital circuit 304 may include a plurality of digital shift registers, each configured to receive an input and produce an output. Also, the digital circuit 304 may include a plurality of digital logic modules 306, each configured to receive the output from a subset of two or more of the plurality of digital shift registers and to provide the input for setting a state of at least one of the subset of the plurality of digital shift registers, the plurality of digital logic modules 306 each configured according to a portion of a numeric solution to a chaotic differential equation.

In one embodiment, the digital logic modules 306 may be configured according to a Runge-Kutta Fourth-order numerical solution to the chaotic differential equation. In another embodiment, the digital logic modules 306 may be configured according to a mid-point numerical solution to the chaotic differential equation. In still another embodiment, the digital logic modules 306 may be configured according to an Euler numerical solution to the chaotic differential equation.

In some embodiments, the digital logic modules 306 may determine the plurality of second values according to addition operations rather than multiplication operations. This optimization of eliminating multiplication operators and associated circuitry may significantly reduce the physical size of the digital logic modules 306 and associated digital circuit 304.

Additionally, the digital circuit 304 may include a post-processing module 310 configured to discard a highest significant bit. Additionally, the post-processing module 310 may discard a lowest significant bit. In a further embodiment, the post-processing module 310 may combine the states of the plurality of digital shift registers to generate a single random output. The post-processing module 310 may include all-digital circuit elements.

In one embodiment, the digital circuit 304 is configured to generate a random numeric output. The random numeric output may be used in, e.g., networking security, digital watermarking, data hiding, and/or encoding applications.

In another embodiment, the digital circuit 304 is configured to generate chaos-based digital modulation and demodulation output such as, e.g., a chaos shift key (CSK) output. Applications of this type of circuit output may include chaotic on-off keying, differential CSK, frequency modulated DCSK, symmetric CSK, and quadrature CSK.

The circuit card 302 may provide structural support and electrical connections to the digital circuit 304. Additionally, the power supply 312 may supply electrical power to the digital circuit 304. In a further embodiment, the apparatus 300 may include a digital clock signal source 314 coupled to the digital circuit 304. The digital circuit 304 may also include a digital clock signal line coupled to each of the plurality of digital shift registers to provide a clock signal for operating the digital shift registers.

The digital circuit 304 may be embodied in various mediums. For example, the digital circuit may be implemented in an Application-Specific Integrated Circuit (ASIC), a Digital Signal Processor (DSP), a Field Programmable Gate Array (FPGA), a microcontroller, or the like. Although certain features of the apparatus 300 and digital circuit 304 have been described as integral to the digital circuit 304 or external to the digital circuit 304, this illustration is not intended to be limiting in any way. For example, in some embodiments, the power source 312 or the digital clock source 314 may be integrated with the digital circuit 304. In other embodiments, the digital state registers 308 and digital logic modules 308 may be implemented in separate digital circuits 304. One of ordinary skill in the art will recognize that a variety of possible configurations may exist.

In one embodiment, the digital clock signal has a first clock edge and a second clock edge. On the first clock edge, the digital shift registers are configured to provide the input to one or more of the plurality of digital logic modules 306. On the second edge, each of the digital shift registers is configured to receive the output from one of the plurality of digital logic modules 306.

In a further embodiment, the digital circuit 304 may include the digital post-processing module 310 configured to generate a chaotic output in response to the outputs received by each of the plurality of digital shift registers. The digital post-processing module 310 may discard a highest significant bit, discard a lowest significant bit, and/or combine the state of the plurality of digital shift registers to generate a single random output.

In a particular embodiment, the digital logic module 306 comprises a plurality of digital adders. This configuration may optimize performance of the digital circuit 304 as well as reduce the physical size of the digital circuit 304 by eliminating multiplication circuitry.

In one embodiment, the digital circuit 304 may generate a random number output, a fixed-point output, or an output that includes a CSK. As shown in FIG. 3, these outputs may be communicated to and/or utilized by a variety of recipients, including a networking device 316, such as a modem or router, a non-transitory storage medium 318 such as, e.g., a hard disk or a memory device, a personal data assistant (PDA) 320, or a computing device 322.

II. Arithmetic Optimizations

Some arithmetic optimizations may be introduced for improving both the area and the delay of the system.

A. Multiplication Elimination

In EQNS. 3, 4 and 5, four multiplication operations are needed. Eliminating such multiplications can significantly reduce the area utilized by the implementation. Since the system may behave chaotic for intervals of h and α (not a single defined point), h and α may be selected such that:

$$h=2^{-a} \quad \text{EQN. 6}$$

$$\alpha=2^b \quad \text{EQN. 7}$$

where a, b>0. By choosing these constants to be in the powers of two, the area consuming multiplication operations are replaced with simple shift operations. These operations are realized by only shift in the wiring of the previous operation output. For example, 4 and 2 may be selected as suitable values for a and b respectively.

Figure 4A:
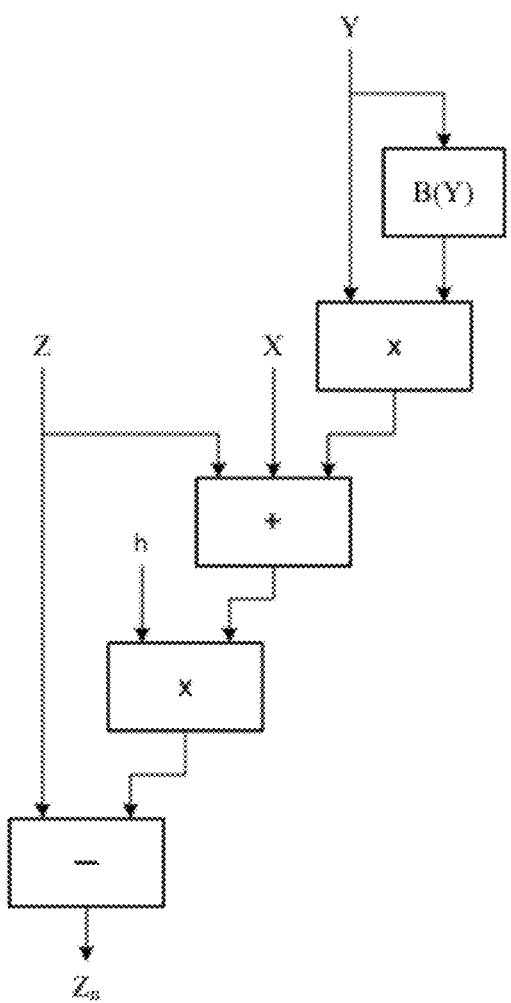
FIGS. 4A and 4B are a schematic block diagrams illustrating an example of arithmetic optimization of the digital chaos generator of FIG. 2 in accordance with various embodiments of the present disclosure.
Figure 4B:
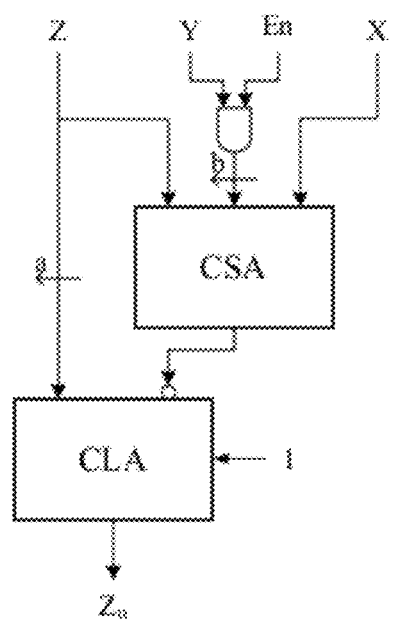

Referring to FIG. 4A, shown is a schematic diagram illustrating the realization of EQN. 5 before the arithmetic optimization, while FIG. 4B shows it after the optimization has been applied, which eliminates the area consuming multiplications. The arrowed variables a and b in FIG. 4B represent the wired shifts.

B. Adders Optimization

Since EQN. 5 may be the bottleneck of the digital chaos generator, fast carry-look-ahead adders (CLA) may be used in its implementation as illustrated in FIG. 4B. On the other hand, normal carry-propagate adders may be used within EQNS. 3 and 4 for area saving. A carry-save adder (CSA) may be used for adding three inputs simultaneously as shown in FIG. 4B.

C. Fixed-Point Representation

Figure 5:
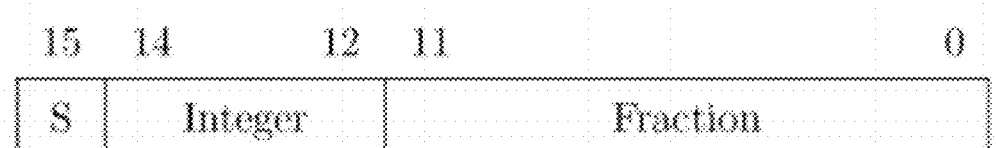
FIG. 5 illustrates an example of a 16-bit fixed-point number realization in accordance with various embodiments of the present disclosure.

In some embodiments, the output of the digital chaos generator may be within an interval bounded by a maximum and minimum. The output integer part may be secured to be bounded within the interval. Using a fixed-point number representation is beneficial for such a system realization. Such a selection may reduce the circuit area and delay significantly without significantly affecting the output precision, due to the already known small bounds values. Additionally, the system may model a chaotic behavior and not calculate very high precision numbers. So, the numbers in the circuit may be represented as fixed-point numbers. For example, the most significant bit may be used for the sign, the following three bits for the integer part, and the rest of the bits for the fraction part. FIG. 5 illustrates an example of a 16-bit fixed-point representation. This elimination may add extra nonlinearity for the circuit and improve its chaotic behavior.

According to simulation results, representing numbers with less than 16-bits may cause the output to not be chaotic. To avoid non-chaotic outputs, a fixed-point representation of 16-bits or more is used for describing the numbers in the system. As noted above, FIG. 5 shows the organization of an example of a fixed-point number representation. In alternative embodiments, other fixed point representations of the same or deferent length may be used.

D. Nonlinear Function Implementation

In embodiments where a fixed point representation is used, the nonlinear element may be realized by an enable (En) line and an array of AND gates as illustrated in FIG. 4B. The enable (En) line may be active in case where Y≤1, neutralizing the AND gates and passing a shifted version of Y. In the other case the enable may be reset, which passes zeros through the gates array. The enable Boolean equation may given by $$\text{Enable}=y(15)'\cdot(y(14)+y(13)+y(12)). \quad \text{EQN. 8}$$

In the example of EQN. 8, the inputs correspond to sign bit and integer bits of FIG. 5.

III. Post-Processing

Post-processing techniques may be used for improving the properties and curing some statistical defects of generated random sequences, but in return these techniques may reduce the throughput of the chaos generator. For example, post-processing techniques such as a Von Neumann technique, bit skipping, or bit counting have produced an improvement in the statistical properties of analog chaos generators. However, experimental results have shown that these techniques did not show significant improvement when employed with a digital chaos generator. Based on digital chaos generator properties and statistical observations, ad-hoc digital post-processing techniques may be used. The ad-hoc digital post-processing techniques may include one or more of the following steps, which may or may not be performed in the sequential order listed.

Step 1: Digital chaos generators can suffer from short term predictability. Discarding one or more of the highest significant bits and keeping only the lowest ones may improve the output properties significantly, thereby removing the short term predictability of the digital chaos generator.

Step 2: The distribution of the odd and even numbers, and so the ones and zeros, may not be balanced. In one embodiment, the post-processing method may balance the output distribution by discarding the lowest significant bit.

Step 3: Experimental results have shown that attaching the three outputs of the digital chaos generator in one sequence improves both the throughput and the statistical properties of the output. In general, the digital post-processing may be based on discarding the group of bits with statistical defects, especially the highest significant bits for chaotic systems. The exact number of bits to keep and discard may be selected based upon experimental results. This selection may be made such that bits from 1 to 6 are only kept, in the case of step 2, with a symbols range from 0 to 63. While in step 3, bits 1 to 3 from each variable may be attached together (or concatenated) forming a circuit output with a symbols range from 0 to 511.

Figure 6A:
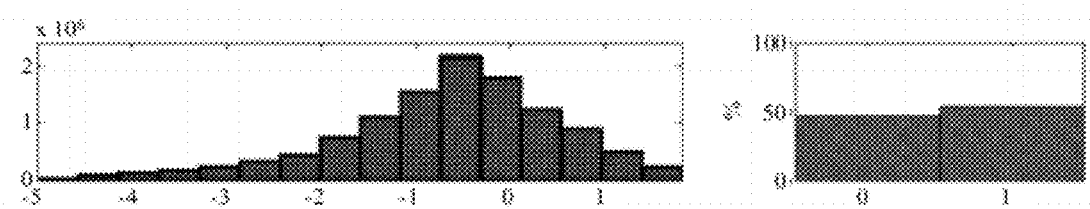
FIGS. 6A-6C illustrate examples of histograms and zero and one bit distributions of the output of the digital chaos generator of FIG. 2 before and after post-processing in accordance with various embodiments of the present disclosure.
Figure 6B:
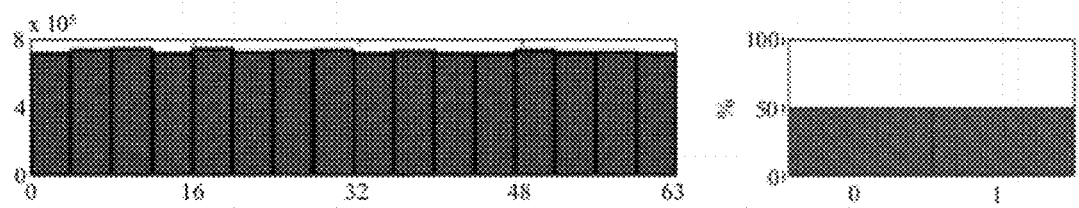
Figure 6C:
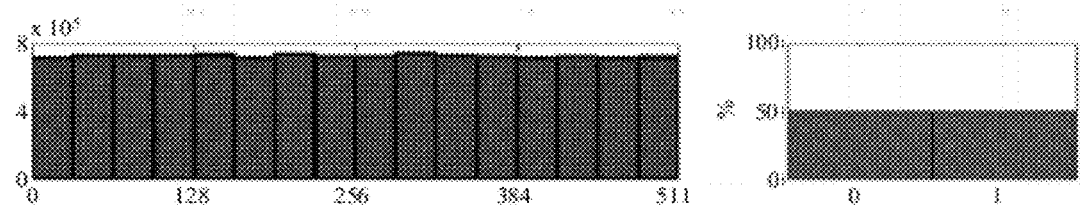

Such embodiments of a digital post-processing method improve the symbols and zeros and ones distributions significantly, as shown in FIGS. 6A-6C. FIG. 6A shows a histogram of the symbols and the ratio of zero and one bits before applying the post-processing. The histogram was calculated for a data set of more than 11 million symbols. The histogram may change from a Gaussian-like distribution of FIG. 6A to a nearly uniform distribution after a post-processing technique has been applied as illustrated in FIGS. 6B and 6C. FIG. 6B illustrates a histogram of the symbols after application of step 2 of the post-processing described above. FIG. 6C illustrates a histogram of the symbols after application of step 3 of the post-processing described above. FIGS. 6B and 6C also show that the applied post-processing techniques balances the zero to one ratio in the chaos generator output.

Figure 7A:
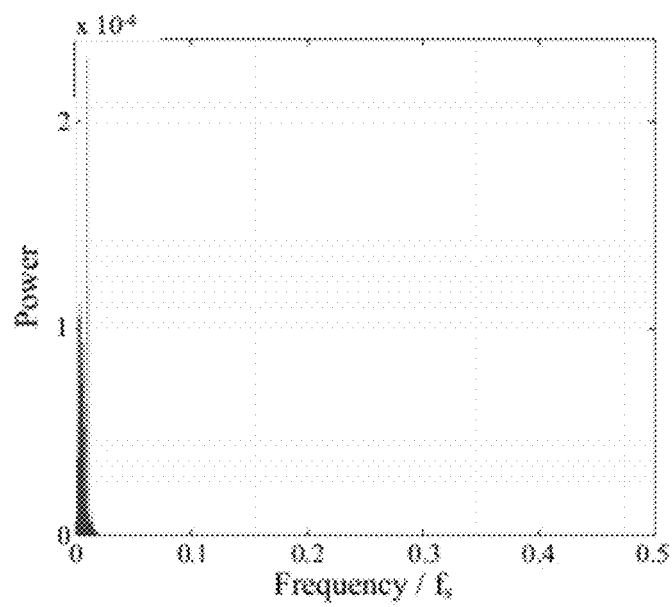
FIGS. 7A-7C illustrate examples of power distribution spectrums of the normalized output of the digital chaos generator of FIG. 2 before and after post-processing in accordance with various embodiments of the present disclosure.
Figure 7B:
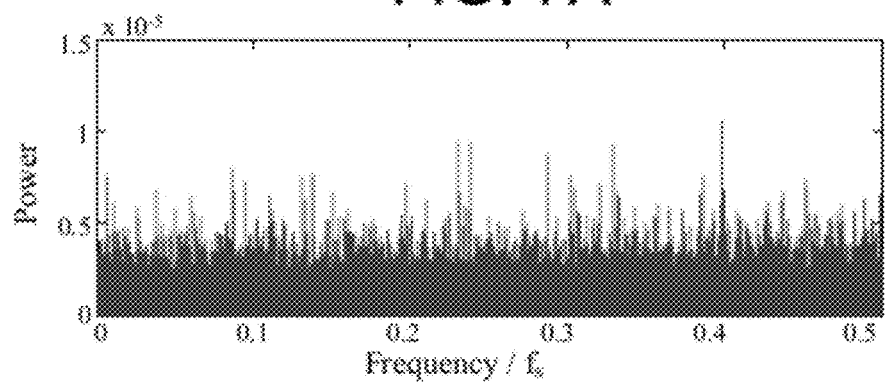
Figure 7C:
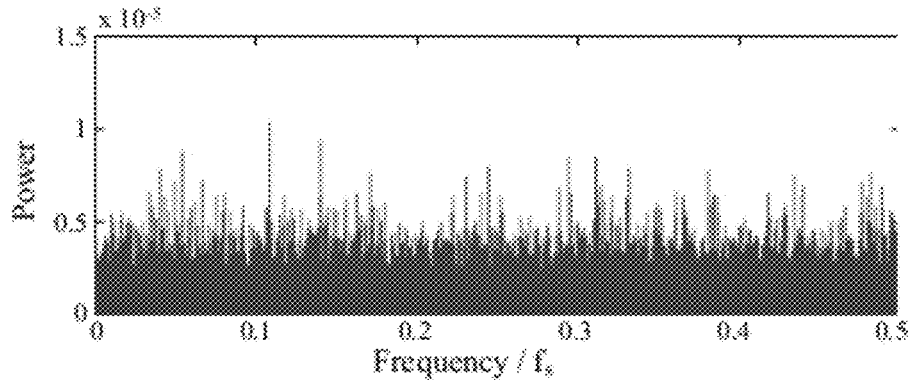

In the same fashion, the post-processing significantly improved the frequency response of the circuit output. Spectrums of the normalized output of the digital chaos generator circuit before and after post-processing are shown in FIG. 7A and FIGS. 7B-7C, respectively. FIGS. 7B and 7C show that application of step 2 and step 3 of the post-processing spreads the power more evenly over the frequency spectrum similar to that of white noise.

IV. Examples

A. Chaos Generator

Figure 8A:
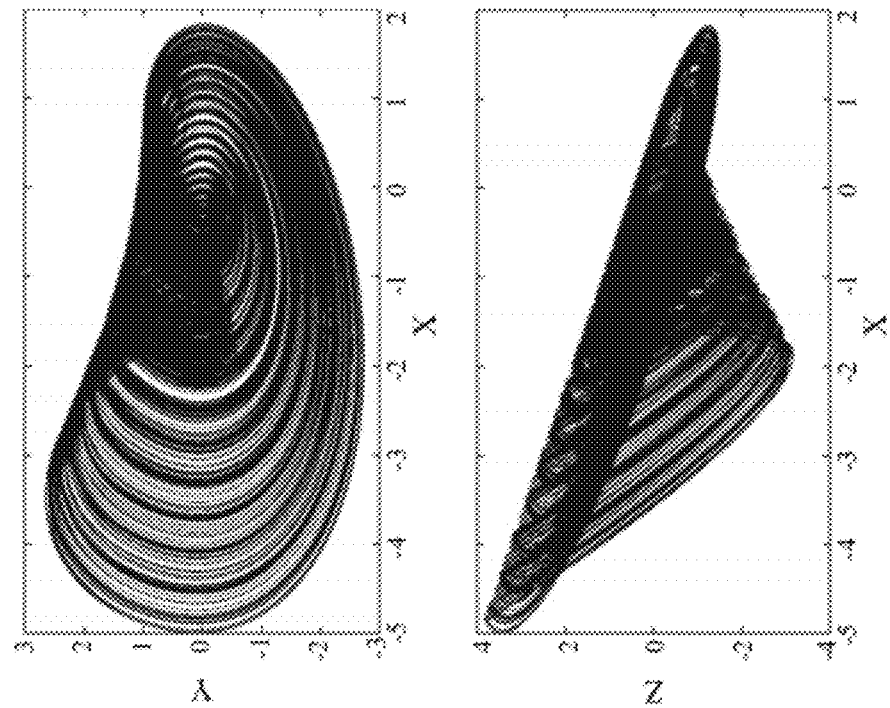
FIGS. 8A and 8B illustrate examples of phasor trajectory diagrams of simulated and implemented output of the digital chaos generator of FIG. 2 in accordance with various embodiments of the present disclosure.
Figure 8B:
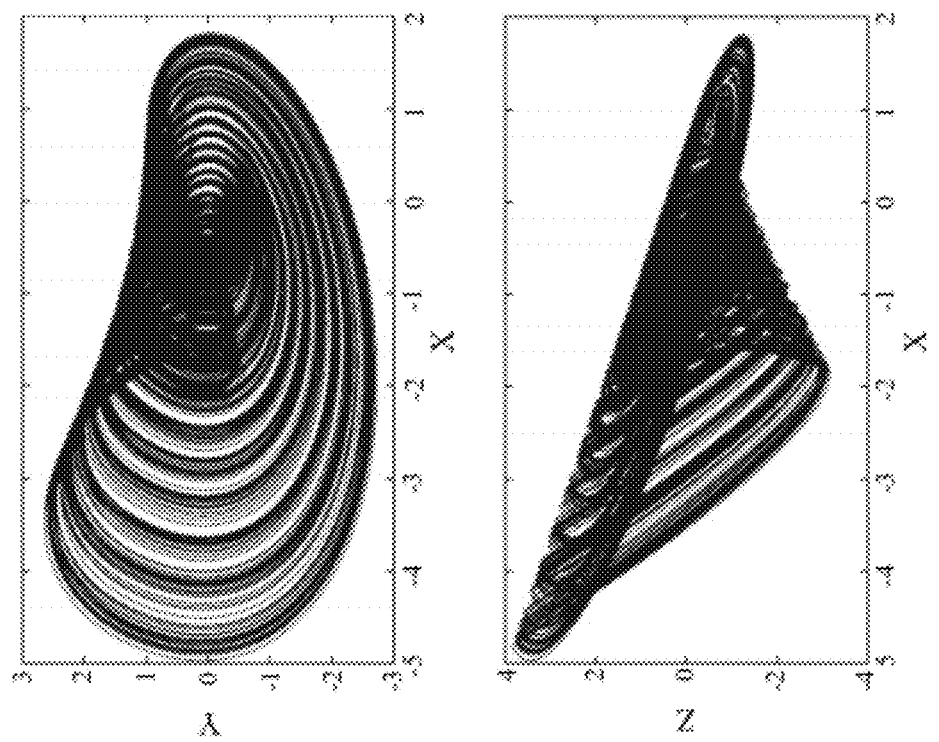

Simulations of the digital chaos generator output show chaotic behavior that is significantly improved over analog chaos generators and match with the numerically solved equations using MATLAB. Referring to FIG. 8A, shown are examples of a phasor trajectory diagrams of the MATLAB simulations of a digital chaos generator output. FIG. 8B shows corresponding phasor trajectory diagrams of the digital chaos generator output. FIGS. 8A and 8B illustrate the chaotic behavior of the generated time series and the matching MATLAB simulations. As shown in FIGS. 8A and 8B, a digital output that is more distributed expresses a better chaotic performance.

Figure 9:
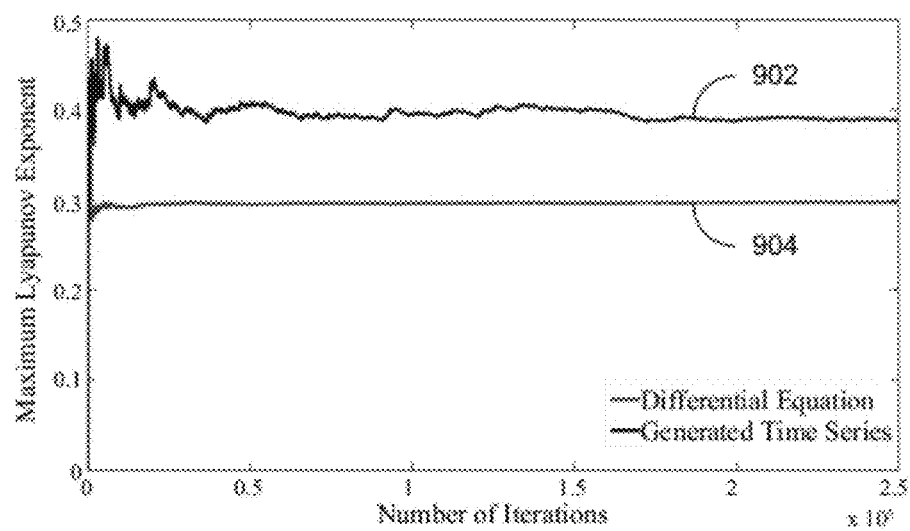
FIG. 9 is a plot of the maximum Lyapunov exponent (MLE) for the digitally chaos generator time series and the original differential equation in accordance with various embodiments of the present disclosure.

While a visual inspection appears to indicate a chaotic phasor trajectory diagram, it may not be a sufficient proof for chaos. Referring to FIG. 9, the generated time series was shown to be chaotic by calculating its maximum Lyapunov exponent 902 for the digitally created time series. The numerically calculated exponent 902 saturates at a value of 0.398 after 250,000 iterations. The positive value of the exponent shows the chaotic behavior of the generated data. The Lyapunov exponent 904 for the original differential equation was also calculated, showing a maximal exponent saturating at 0.297. The improvement in the chaotic response was due to the nonlinearity that was added to the system by the digital implementation, such as the finite number representation used in any digital system. FIG. 9 shows the maximum Lyapunov exponent (MLE) for both of the generated time series 902 and the original differential equation 904 versus the number of iteration of numerical solution.

1. Implementation

A 16-bit fully digital chaos (random number) generator describing EQN. 1 was simulated using Verilog hardware descriptive language (HDL) and implemented on Altera® FPGAs using an Altera Quarus® II package. Even using an FPGA, the system fits in a very small area and expresses high throughput. The Verilog implementation of the digital chaos generator was also simulated using the GNU Icarus Verilog. TABLE 1 shows the area utilization of the 16-bit digital chaos generators for various Altera Stratix® III and IV FPGAs. TABLE 1 shows the utilization percentage of logic, memory and register units as well as the total area utilization. The results show that the embodiment of a digital random number generator may fit into an extremely small area, showing very high area utilization. The 16-bit digital chaos generator can fit in less than 0.019% of the Stratix® IV EP4SGX530 KH40C2(ES) FPGA device.

TABLE 1

Detailed area utilization in percent for the 16-Chaos Generators for various Altera Stratix ® III and IV FPGAs.

| FPGA Device | Logic | Memory | Registers | Total Area |
|---|---|---|---|---|
| EP4SGXS30KH40C2 | 0.035% | 0% | 0.011% | 0.019% |
| EP4SGXS30NF4SC2ES | 0.036 | 0% | 0.011% | 0.019% |
| EP4S40G2F40-1 | 0.083 | 0% | 0.026 | 0.044 |
| EP3SL200H780C2 | 0.096 | 0% | 0.030 | 0.050 |

TABLE 2 shows the maximum frequency in MHz and the maximum throughput in MBits/sec for one embodiment of a 16-bit chaos generator, before and after post-processing is applied. The post processing decreases the throughput from 16 bits/cycle to 9 bits/cycle.

TABLE 2

Maximum frequency in MHz and throughput in MBits/sec for the 16-bit chaos generator (before post-processing/after post-processing), for various Altera Stratix ® III and IV FPGAs.

| FPGA Device | Max. Frequency | Max. Throughput |
|---|---|---|
| EP4SGXS30KH40C2 | 197.28/199.48 | 3156.48/1798.56 |
| EP4SGXS30NF4SC2ES | 195.62/188.18 | 3129.92/1693.62 |

TABLE 2-continued

Maximum frequency in MHz and throughput in MBits/sec for the 16-bit chaos generator (before post-processing/after post-processing), for various Altera Stratix ® III and IV FPGAs.

| FPGA Device | Max. Frequency | Max. Throughput |
|---|---|---|
| EP4S40G2F40-1 | 210.61/200.52 | 3369.76/1804.68 |
| EP3SL200H780C2 | 209.91/199.96 | 3358.56/1799.64 |

Figure 10A:
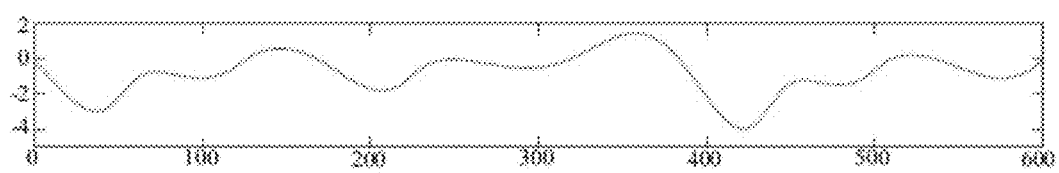
FIGS. 10A-10C illustrate examples of the output of the digital chaos generator of FIG. 2 before and after post-processing in accordance with various embodiments of the present disclosure.
Figure 10B:
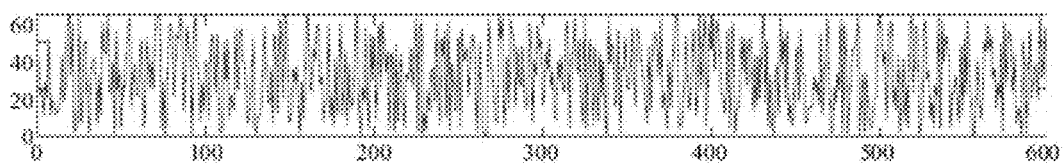
Figure 10C:
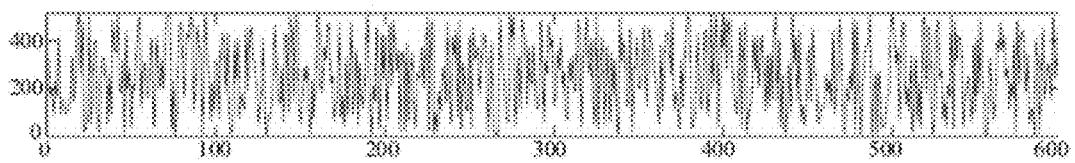

FIGS. 10A-10C shows an example of the digital chaos generator output versus time before (FIG. 10A) and after (FIGS. 10B and 10C) applying the post-processing described above. FIG. 10B illustrates the generator output after application of step 2 of the post-processing and FIG. 10C illustrates the generator output after application of step 3 of the post-processing. From FIGS. 10A-10C, it appears that the applied post-processing decreases the predictability of the digital chaos generator output. Also the post-processing increases the power of the higher frequency components, as illustrated in the normalized output power spectrum of FIGS. 7B and 7C.

2. Statistical Test

While the digital chaos generator output has been shown to be random, one embodiment was tested using the National Institute of Standards and Technology (NIST) Sp. 800-22 random tests package for demonstrating the statistical improvement introduced by applying the purposed post-processing. The test was applied on the outputs of different design phases, and the final post-processed system output was found to pass all of the 15 Sp. 800-22 tests with a success rate of 100%. TABLE 3 shows the results of the NIST Sp. 800-22 statistical test. The results are given for the original output and different post processing techniques: (a) no post-processing; (b) bit-counting technique (each four bit is counted together); (c) Von Neumann post-processing; (d) post-processing (step 2) in which only the bits from 1 to 6 are kept from x, and (e) post-processing (step 3) in which bits from 1 to 3 are kept from the three variables and attached together.

TABLE 3 shows the proportion value (PP) as a fraction of one, and the validity of the P-values distribution, the P-value of the P-values (PV). Accordingly, the PV is valid for values greater than 0.0001. For the final output, the minimum PV was 0.066 and the maximum was 0.91. The throughput (TP) in bits per cycle is also given for each case. The NIST results show that bit-counting and a Von Neumann improvement over the original data is not sufficient for passing all the tests. Also, even with the improvement introduced by step 3 of the purposed post-processing (keeping bits from 1 to 6), not all of the 15 tests were passed. By adding step 3 of attaching together bits 1 to 3 from the three variables, the post-processing successfully passed 100% of the tests.

TABLE 3

NIST Sp. 800-22 test results for (a) no post processing, (b) bit-counting technique (each four bit is counted together), (c) Von Neumann post-processing, (d) post processing in which only the bits from 1 to 6 are kept from x, and (e) post processing in which bits from 1 to 3 are kept from the three variables and attached together. The table shows the proportion value (PP), and the validity of the P-values distribution (PV). The throughput (TP) in bits per cycle is given for each case.

|  | (a) | | (b) | | (c) | | (d) | | (e) | |
|---|---|---|---|---|---|---|---|---|---|---|
|  | PV | PP | PV | PP | PV | PP | PV | PP | PV | PP |
| Frequency | | 0.5 | ✓ | 0.5 | ✓ | 0.9 | ✓ | 1 | ✓ | 1 |
| B. Frequency | | 0.3 | | 0.3 | ✓ | 0.9 | ✓ | 1 | ✓ | 1 |
| C. Sums | | 0.4 | ✓ | 0.4 | ✓ | 0.9 | ✓ | 1 | ✓ | 1 |
| Runs | | 0.3 | ✓ | 0.8 | ✓ | 0.9 | ✓ | 0.9 | ✓ | 1 |
| Longest Run | | 0.2 | ✓ | 0.8 | ✓ | 1 | ✓ | 1 | ✓ | 1 |
| Rank | | 0 | | 0 | ✓ | 1 | | 0.97 | ✓ | 1 |
| FFT | ✓ | 1 | ✓ | 1 | ✓ | 0.9 | ✓ | 1 | ✓ | 1 |
| N.O. Temp. | ✓ | 1 | ✓ | 1 | ✓ | 1 | ✓ | 1 | ✓ | 1 |
| O. Temp. | | 0 | | 0 | | 0 | ✓ | 0.6 | ✓ | 1 |
| Universal | | 0 | | 0 | | 0 | ✓ | 1 | ✓ | 1 |
| App. Entropy | | 0 | | 0 | | 0 | ✓ | 1 | ✓ | 1 |
| R. Excur. | | 0 | | 0 | | 0 | | 1 | ✓ | 1 |
| R. Excur. V. | | 0 | | 0 | | 0 | | 1 | ✓ | 1 |
| Serial | | 0 | | 0 | | 0.1 | | 0.6 | ✓ | 1 |
| L. Complexity | ✓ | 0.9 | ✓ | 1 | ✓ | 1 | ✓ | 1 | ✓ | 1 |
| TP [bits/cycle] | | 16 | | 4 | | 3.36 | | 6 | | 9 |

B. Lorenz Butterfly Chaos Attractor

Lorenz butterfly chaotic attractor is a well-known chaotic system, introduced by E. D. Lorenz in 1961. This system was defined by three differential equations, with the multiplication operation as the nonlinear element, such that, $$\dot{X} = \alpha(Y-X) \qquad \text{EQN. 9}$$

$$\dot{Y} = (\rho-Z)X - Y \qquad \text{EQN. 10}$$

$$\dot{Z} = XY - \beta Z \qquad \text{EQN. 11}$$

where α, β and ρ are the system parameters.

In general, chaotic oscillators have found applications in digital communication systems as a key component in the chaos shift keying (CSK). Also chaos generators are considered to be one of the main sources of random number generation. Many analog implementations of the Lorenz attractor have been introduced, either using discrete op-amps or even using MOS transistors.

The present disclosure describes three different fully digital realizations for the butterfly (Lorenz) attractor. These realizations are based on different numerical solutions for the Lorenz differential equations (EQNS. 9-11). These digital chaos generators were built using Verilog HDL, and implemented on Altera® FPGAs using Altera Quartus® II package for proof of concept. The introduced digital implementations utilize an extremely small area, which can fit into areas ranging from 0.033% to 0.36% of a Stratix® IV family FPGA, with a maximum throughput reaching up to 4.95 Gb/S. The introduced digital implementations do not include capacitors or inductors. It has been shown that a digital implementation adds an extra nonlinearity to the system. Also, the numerical solutions with less accuracy also add extra nonlinearity to the system and improve the chaotic response (Lyapunov exponent) of the output. These techniques use fewer resources while expressing higher performance.

1. Numerical Solution

In one embodiment, the Lorenz system may be realized by solving its differential equation using Runge-Kutta fourth-order, mid-point, or Euler techniques. These techniques range from simple implementations to highly accurate realizations. In the following subsection, the three techniques are introduced. To begin, assume the following differential equation, $$\dot{A} = F_A(A, B, \ldots) \quad \text{EQN. 12}$$

i. Runge-Kutta Fourth-Order

EQN. 12 can be solved using Runge-Kutta Fourth-order in the following steps, $$K_{A1} = F_A(A_i, B_i, \ldots) \quad \text{EQN. 13a}$$

$$K_{A2} = F_A(A_i + 0.5hK_{A1}, B_i + 0.5hK_{B1}, \ldots) \quad \text{EQN. 13b}$$

$$K_{A3} = F_A(A_i + 0.5hK_{A2}, B_i + 0.5hK_{B2}, \ldots) \quad \text{EQN. 13c}$$

$$K_{A4} = F_A(A_i + hK_{B3}, B_i + hK_{B3}, \ldots) \quad \text{EQN. 13d}$$

$$A_{i+1} = A_i + h(K_1 + 2K_2 + 2K_2 + K_4)/6 \quad \text{EQN. 13e}$$

where $A_i$ and $A_{i+1}$ are the solutions of the variable A at steps i and i+1 respectively, and h is the time step. Evaluating the solution using this technique uses five vertically dependent calculations per each step.

ii. Mid-Point

The solution can be evaluated less accurately using a midpoint technique that includes only two dependent calculations. The midpoint technique may be expressed as:

$$K_A = F_A(A_i, B_i, \ldots) \quad \text{EQN. 14a}$$

$$A_{i+1} = A_i + h \cdot F_A(A_i + 0.5hK_A, B_i + 0.5hK_B, \ldots) \quad \text{EQN. 14b}$$

iii. Euler

The Euler technique is a one calculation per step technique. In return, it produces less accurate results compared with the Runge-Kutta Fourth-order or mid-point techniques. The Euler technique may be written as:

$$A_{i+1} = A_i + h \cdot F_A(A_i, B_i, \ldots) \quad \text{EQN. 15}$$

2. Digital Implementation

The digital system can be realized using a simple register transfer module. Three state variables X, Y and Z are implemented as registers, rather than capacitors as used in the analog realizations. The combinational transfer units in the scheme represent the numerical solution implementation.

Figure 11:
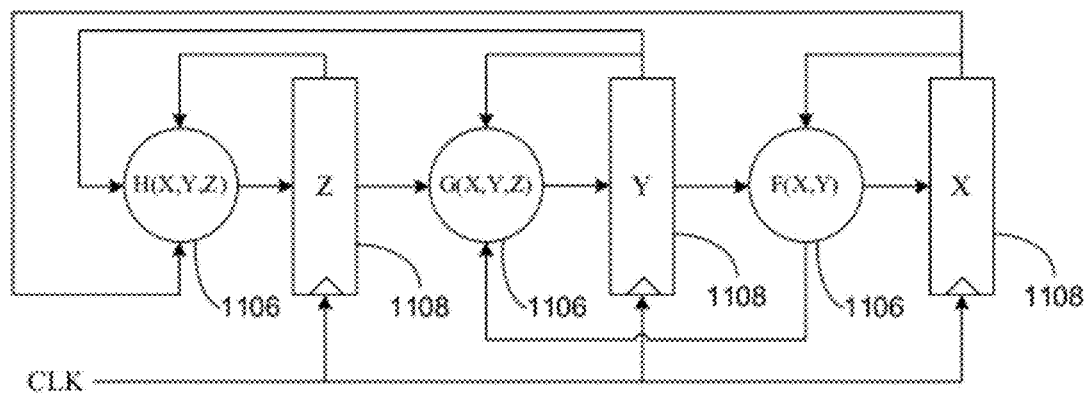
FIG. 11 is a schematic block diagram illustrating another example of a digital realization of a chaos generator for generating a chaotic output in accordance with various embodiments of the present disclosure.

FIG. 11 shows a general schematic of the digital implementation of the chaos generator. The transfer functions F(X,Y), G(X,Y,Z), and H(X,Y,Z) represent the combinational functional realization of the numerical solutions generating the new state for the variables X, Y and Z respectively. The transfer functions are implemented as digital logic modules 1106 and the variables are implemented as registers 1108. The transfer functions may be obtained by applying EQNS. 13, 14, and 15 of the Lorenz system.

Such embodiments of a digital implementation can be interpreted as a nonlinear extension for the linear feed-back shift registers. Since the output is chaotic, then the period of the output repetition reaches infinity with an efficient digital implementation.

3. Arithmetic Optimizations

Some arithmetic optimizations are introduced in the following subsection for improving both the area utilization and the speed of the system.

i. Multiplication Elimination

Many of the required multiplications for the numerical solutions can be eliminated with the aid of suitable selection of the system parameters. The system parameters are selected to be in the powers of two, to transform the multiplications into simple wired shifts. For example, the parameters may be selected such that $\alpha=2^3$, $\beta=2^1$, $\rho=2^5$, and $h=2^{-6}$. Eliminating such multiplications reduces the system's area significantly.

While all the parameters have to be selected for producing a chaotic output, the time step (h) may have another high impact on the total number of bits required for number representation in the system. On the other hand, the variable multiplications XY and XZ cannot be eliminated in some embodiments. These multiplications may be digitally implemented as a two's complement based multipliers.

ii. Fixed-Point Representation

As discussed above, the outputs of the chaos generator may be maintained within intervals of bounded maximums and minimums. Therefore, a fixed-point numbers representation may be a very good selection for the system realization. This selection may reduce the circuit area and delay significantly.

Figure 12:
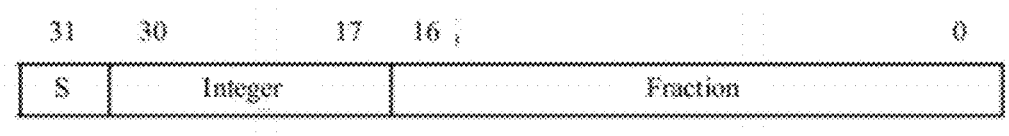
FIG. 12 illustrates an example of a 32-bit fixed-point number realization in accordance with various embodiments of the present disclosure.

FIG. 12 shows the distribution of a 32-bit fixed point number representation used within one embodiment of the system. In alternative embodiments, other fixed point representations of the same or deferent length may be used. Such, selection may be governed by the bounding interval of the output, the bounding interval of the intermediate results, and the effect of the negative shift of the parameter (h).

4. Chaotic Response Improvement

The finite representation of numbers in a digital system adds an extra nonlinearly to the digital chaos system, due to the truncated or rounded parts of the used numbers. This nonlinearity appears more in the fixed-point number representation and is amplified due to the sensitivity of the chaotic systems. The added nonlinearity may reflect as a better chaotic response with higher maximum Lyapunov exponents.

In such embodiments, the numerical solution for the system adds an extra nonlinearity. One unexpected result is that the less accurate numerical solution adds more nonlinearity to the system compared with the higher accurate solution, given that all of the solutions are maintaining a chaotic response.

Figure 13:
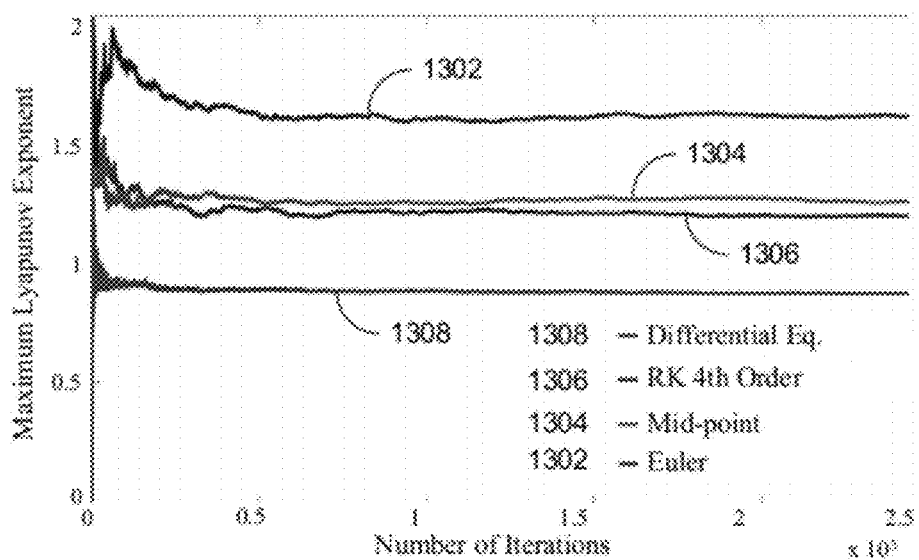
FIG. 13 is a plot of the maximum Lyapunov exponent (MLE) for the digitally chaos generator time series for Runge-Kitta Fourth order, mid-point, and Euler numerical solutions and the original differential equation in accordance with various embodiments of the present disclosure.

FIG. 13 shows the calculated maximum Lyapunov exponent (MLE) for the different numerical solution implementations and the original differential equation. The calculated MLEs show that the digital realizations have a better chaotic response than the original differential equation. Also, the calculated values show that numerical solutions with less accuracy exhibit a better chaotic response. This improvement in response may be due to the added nonlinearity by the less accurate solution. The calculated MLEs are 1.59, 1.24, 1.18, and 0.87 for the Euler 1302, mid-point 1304, and Runge-Kutta fourth-order 1306 generated time series and the original differential equations 1308 respectively.

5. Experimental Results

Embodiments of the described digital chaos generators were built using Verilog HDL, and simulated using the GNU Icarus Verilog, and for Altera FPGAs using Altera Quartus® II package. The digital chaos system was synthesized with the build for speed option selected.

The circuit simulation output show an excellent chaotic behavior. The chaotic response of the three digital chaos generator implementations were verified by a butterfly phaser diagram of the output. The generated time series was also shown to be chaotic by calculating its MLE for the digitally generated time series. The numerically calculated MLE was made using 250,000 iterations as shown in FIG.

13. The positive value of the MLE confirms the chaotic behavior of the generated data.

Figure 14A:
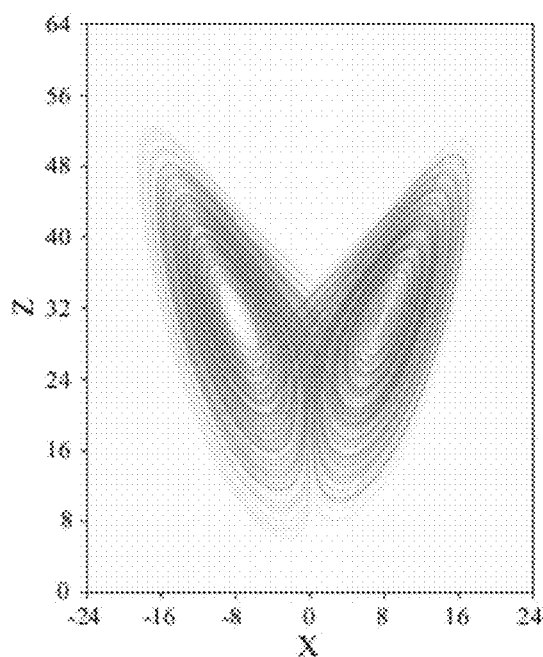
FIGS. 14A-14C illustrate examples of phasor trajectory diagrams of Runge-Kitta Fourth order, mid-point, and Euler numerical solutions and the original differential equation of FIG. 13 in accordance with various embodiments of the present disclosure.
Figure 14B:
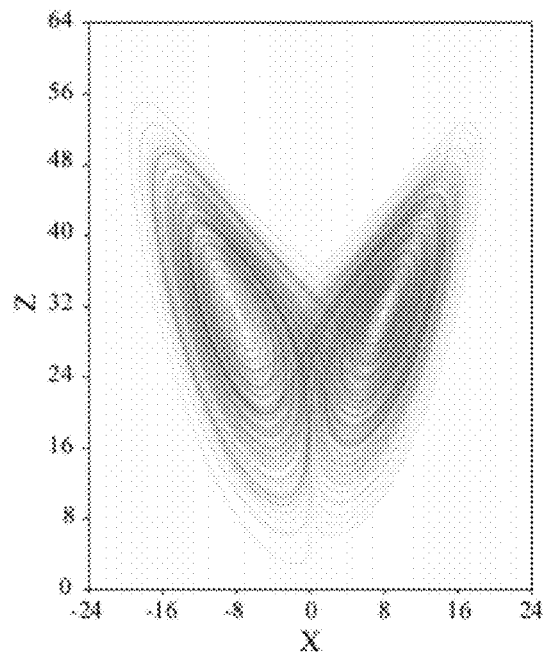
Figure 14C:
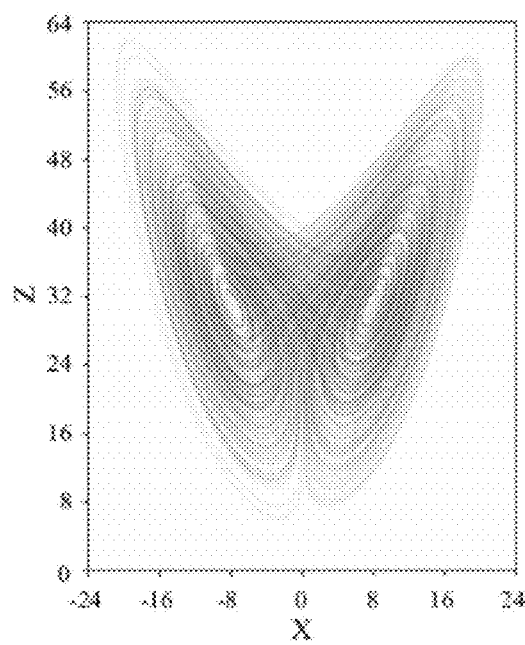

FIGS. 14A-14C show the phasor diagrams of the circuit output of the three different digital implementations. As seen from the diagrams, the Euler realization (FIG. 14C) for the attractor covers more area and is more distributed over the covered area, compared with Runge-Kutta fourth-order (FIG. 14A) and mid-point (FIG. 14B) implementations, which can be interpreted as a better chaotic response. Also, the phasor diagrams show that mid-point realization (FIG. 14B) expresses slightly better chaotic response compared with that of Runge-Kutta fourth-order (FIG. 14A). These results are consistent with the MLE results of FIG. 13.

i. Circuit Resources

The digital realization of the 32-bit chaos generator uses an extremely small area, which can fit into areas ranges from 0.033% to 0.36% of a Stratix® IV family FPGA, depending on the numerical solution realized and the available resources of the FPGA. The throughput of the digital chaos generator circuit also varies depending on the numerical solution. While the Runge-Kutta fourth-order implementation did not provide a throughput of more than 0.988 Gb/S, the Euler realization reached a maximum throughput of up to 4.95 Gb/S.

TABLE 4 shows the detailed area utilization in percent and maximum frequency and throughput for the different implementations of the digital chaos generator. This data was calculated using Altera Quarus® II for three different Stratix® IV family FPGAs.

Figure 15:
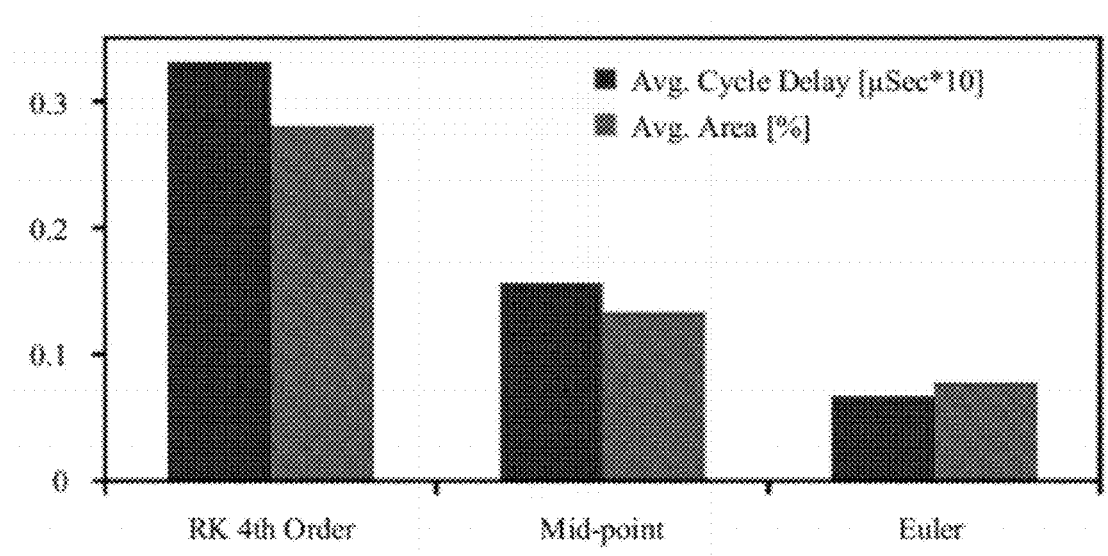
FIG. 15 illustrates examples of average area utilization and cycle delay for the different digital chaos generator implementations of FIG. 11 in accordance with various embodiments of the present disclosure.

FIG. 15 shows the average area utilization in percent and the cycle delay for the three digital circuit realizations. FIG. 15 and the MLE data of FIG. 13 support the idea that the higher accuracy techniques require more on-chip-area and delay, but without introducing any improvement in the chaotic response.

Figure 16A:
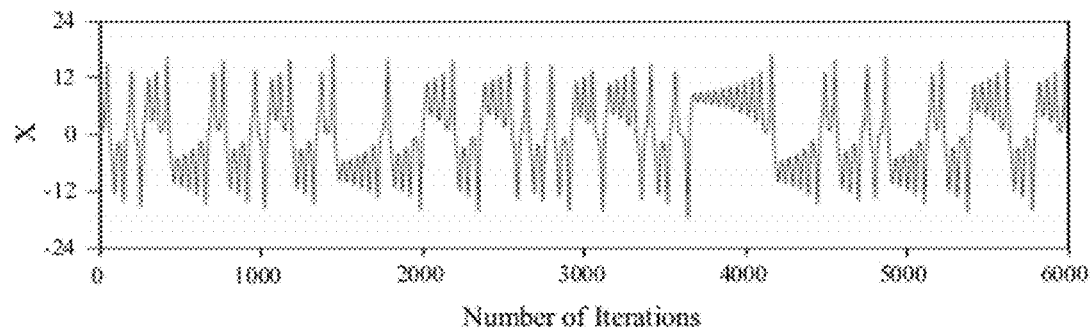
FIGS. 16A-16C illustrate examples of the output of the digital chaos generator of FIG. 11 for Runge-Kitta Fourth order, mid-point, and Euler numerical solutions in accordance with various embodiments of the present disclosure.
Figure 16B:
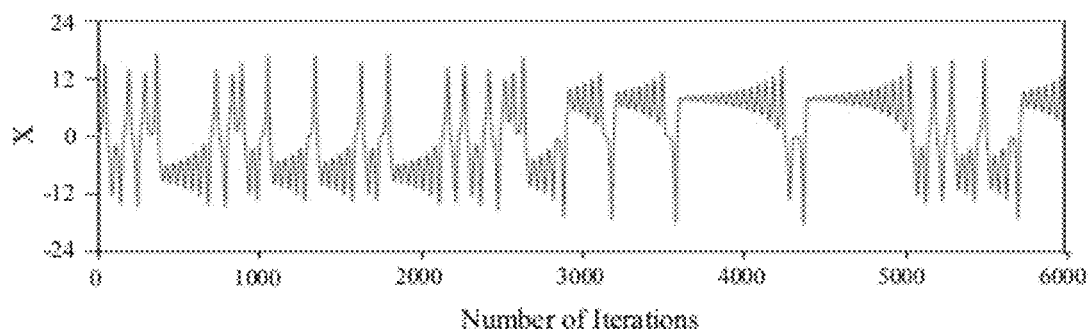
Figure 16C:
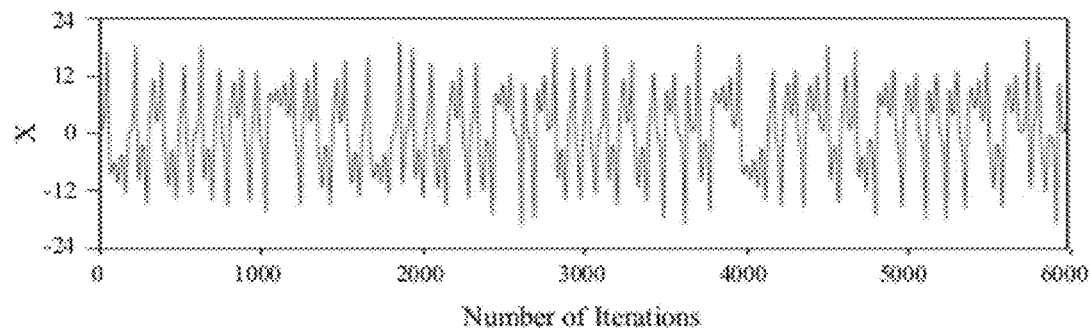

The time series outputs of the three digital chaos generators are shown in FIGS. 16A-16C. Since the critical points of the Lorenz system are symmetric around the X=0 plane, the rate of zero-crossing of variable X is proportional to the jumping between the critical points. For a test set of one million iterations, the zero-crossing of the variable X is 8.3%, 8.4% and 1.2% for Runge-Kutta fourth-order (FIG. 16A), mid-point (FIG. 16B), and Euler (FIG. 16C) implementations, respectively.

C. Jerk-Equation Oscillators

Digital implementations of nonlinear jerk-equations may also be used as a chaos generator. The digital design of four jerk-equation based systems is examined using third-order nonlinear ordinary differential equations (ODEs) that are harmonic oscillators with a nonlinear memory term. These systems may be generally defined as:

$$\dddot{X} = -A\ddot{X} - B\dot{X} + G(X) \quad \text{EQN. 16}$$

where $G(X)$ defines the nonlinear element for the four different systems, such that:

$$G(X) = \begin{cases} C|X| - D & \text{System 1} \\ CX - D \cdot \text{sgn}(X) & \text{System 2} \\ -C\left(\dfrac{X^2}{D} - D\right) & \text{System 3} \\ -CX\left(\dfrac{X^2}{D} - 1\right) & \text{System 4} \end{cases} \quad \text{EQN. 17}$$

16-bit and 32-bit versions of each system were implemented. In some embodiments, the outputs were transformed through subtraction or bitwise XOR to yield new chaos systems. The statistical distribution of the output data is shown to be dependent upon the post-processing. A digital realization allows for controllable versions of each system that can switch between periodic and chaotic modes of operation based upon the selection input. All systems were designed in Verilog HDL and experimentally verified on a Xilinx Virtex 4 FPGA with the outputs obtained by an oscilloscope from the synthesized circuit. All four implemented digital chaos generators were compact with logic utilization ranging from 0.71% to 1.63% of about 30K ALUT logic units and throughputs ranging from 4.54 Gb/S to 14.15 Gb/S.

1. Digital Implementation i. Numerical Solution

Chaos generators may be designed digitally by realizing the numerical solution of nonlinear differential equations. Here, all systems are third-order nonlinear ODEs that can be decomposed into three first-order systems as follows:

$$\dot{Z} = \ddot{Y} = \dddot{X} = S(X, Y, Z) \quad \text{EQN. 18}$$

TABLE 4

Detailed area utilization in percent and maximum frequency and throughput (TP) for the different implementations of a digital chaos generator on various Altera Stratix ® IV FPGAs.

| FPGA Device | Method | Logic (%) | Memory (%) | Registers (%) | Total Area (%) | Max. Freq. (MHz) | Max. TP (Gb/S) |
|---|---|---|---|---|---|---|---|
| EP4SGXS30K H40C2 | RK 4$^{th}$-Order | 0.832 | 0 | 0.0683 | 0.3602 | 30.63 | 0.98 |
| | Mid-point | 0.3585 | 0 | 0.0683 | 0.1707 | 66.86 | 2.204 |
| | Euler | 0.1835 | 0 | 0.0683 | 0.1007 | 154.77 | 4.953 |
| EP4SGX530H H35C2 | RK 4$^{th}$-Order | 0.2753 | 0 | 0.0226 | 0.1192 | 29.17 | 0.933 |
| | Mid-point | 0.1271 | 0 | 0.0226 | 0.0599 | 62.19 | 1.989 |
| | Euler | 0.0607 | 0 | 0.0226 | 0.0333 | 140.06 | 4.482 |
| EP4SGX180D F29C2X | RK 4$^{th}$-Order | 0.833 | 0 | 0.0683 | 0.3605 | 30.88 | 0.988 |
| | Mid-point | 0.3585 | 0 | 0.0683 | 0.1707 | 68.89 | 2.204 |
| | Euler | 0.1835 | 0 | 0.0683 | 0.1007 | 150.88 | 4.828 |

The Euler approximation (with step size h) can be applied to each of the first-order systems as follows:

$$X_{t+h} = X_t + hY_t = U(X_t, Y_t) \quad \text{EQN. 19}$$

$$X_{t+h} = Y_t + hZ_t = U(Y_t, Z_t) \quad \text{EQN. 20}$$

$$Z_{t+h} = Z_t + hS(X_t, Y_t, Z_t) = V(X_t, Y_t, Z_t) \quad \text{EQN. 21}$$

where $S(X_t, Y_t, Z_t)$ may be split into the linear part of the system $L(X_t, Y_t, Z_t)$ and the nonlinear part of the system is $N(X_t)$ as defined by $G(X)$ in EQN 17, which gives:

$$V(X_t, Y_t, Z_t) = Z_t + h[L(X_t, Y_t, Z_t) + N(X_t)] \quad \text{EQN. 22}$$

ii. Digital System Design

Figure 17:
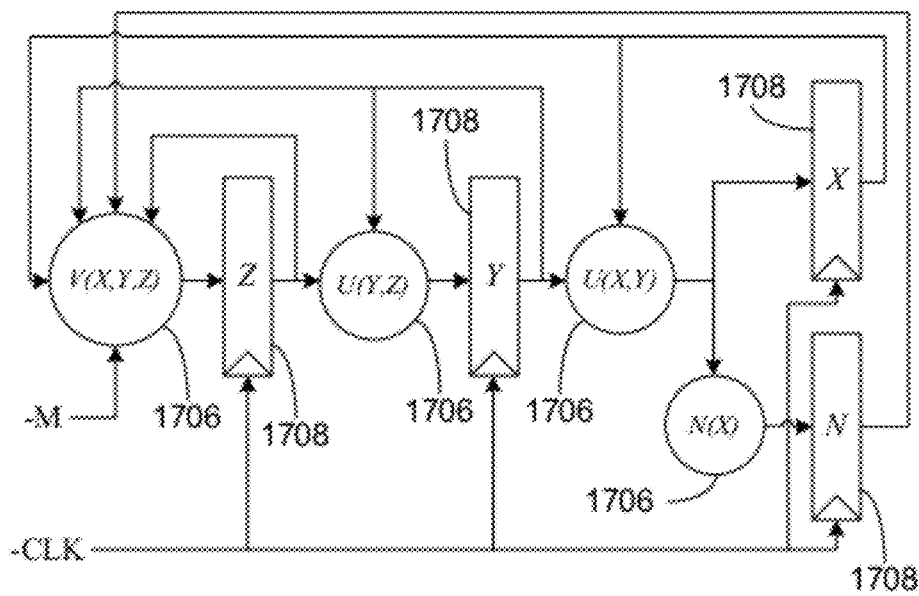
FIGS. 17 and 18 are a schematic block diagrams illustrating other examples of digital chaos generators for generating a chaotic output in accordance with various embodiments of the present disclosure.

Referring to FIG. 17, shown is another example of a fully digital chaos generator for implementing the nonlinear jerk-equations (EQNS. 16-17) above. A standard fixed-point two's complement representation may be used with the four most significant bits used for sign and integer part and the remaining for the fractional part as illustrated in FIG. 5. The combinational blocks U(X,Y), U(Y,Z), and V(X,Y,Z), which are implemented in digital logic modules 1706, calculate updated values of the state variables {X, Y, Z} and store these values in the registers 1708 on the next positive clock edge. A bottleneck can occur at V(X,Y,Z) because of the computation of the nonlinear component N(X) and the Euler approximation L(X,Y,Z). The nonlinear component N(X) may be included in the digital logic module 1706 that implements V(X,Y,Z) or determined by a separate digital logic module 1706 as illustrated in FIG. 17. In some embodiments, the nonlinear term N(X) can be predetermined and stored in a separate temporary register to increase performance of the digital chaos generator. As a result of this optimization, the maximum frequency was found to improve by about 25% for all four systems, justifying the extra register. In order to make the digital systems controllable, a system input (M) controls whether the output of the system is periodic (M=0) or chaotic (M=1). This can be accomplished by adjusting the parameters A, B, C, and D of EQNS. 16 and 17 and using multiplexors.

iii. Parameter Optimization

In order to fully exploit the high-speed digital circuitry, scalar parameters are optimized to implement a fast, area-efficient digital design. In each system, reducing the parameters A, B, C, and D to values of the form $2^k$ will convert scalar multiplications to simple arithmetic shifts in the binary domain. Similarly, the Euler step size h is constrained to be equal to $2^{-5}$ for all four systems in EQN. 17. TABLE 5 illustrates two sets of optimized parameters (chaotic and periodic) based on MATLAB simulations of the four chaotic systems of EQN. 17.

TABLE 5

Optimized ODE parameters for periodic and chaotic systems.

| System | Mode | A | B | C | D |
|---|---|---|---|---|---|
| 1 | Periodic | 0.5 | 0.5 | 0.25 | 0.5 |
| 1 | Chaotic | 0.25 | 0.5 | 0.25 | 0.5 |
| 2 | Periodic | 0.25 | 1 | 1 | -0.5 |
| 2 | Chaotic | 0.5 | 1 | 1 | 2 |
| 3 | Periodic | 1 | 2 | 1 | 2 |
| 3 | Chaotic | 0.5 | 2 | 1 | 2 |
| 4 | Periodic | 0.25 | 1 | 0.25 | 16 |
| 4 | Chaotic | 0.5 | 1 | 0.5 | 16 |

The parameters A, B, C, and D for each system of EQNS. 16 and 17 were optimized to provide either periodic or chaotic modes of operation as shown in TABLE 5. The selection input (M) determines whether the mode of operation is chaotic or periodic. In order to minimize the hardware impact of introducing controllability, at most two of the four parameters were modified to change the mode of operation.

iv. Precision Based Chaos Improvement

The digital chaos generators are implemented with 16-bit and 32-bit bus widths for variables {X, Y, Z}. Chaotic systems with post-processing involving either a difference or XOR operation on the two output sets were also implemented. Implementations of the systems were initialized with the same initial conditions. Iterative synthesis indicates that a minimum of 14, 12, 14 and 15 bit bus widths for systems 1, 2, 3 and 4, respectively, ensure production of a reliable chaotic output. This minimum precision overcomes truncation errors inherent in the digital chaos generator systems.

2. Chaotic Response

Attractors or phasor trajectory diagrams of the digital chaos generator output were generated to examine the chaotic output behavior. The 16-bit and 32-bit implementations of the original systems were found to be visually indistinguishable. The signum nonlinearity system (system 2 of EQN. 17) notably showed a behavior similar to a Chua double-scroll attractor. All of the systems are initialized with the same initial conditions (X=0, Y=0.5, and Z=0). The size of post-processed attractors is comparable to the original systems, suggesting that the chaos is a function of both digital implementation and the chaotic system. Extra precision in the 32-bit system creates long term divergence between the 16-bit and 32-bit implementations. It was found that the attractors for differential post-processing are more closely centered about zero, a valuable property for random number generation. The attractors for XOR post-processing are noticeably disordered due to the non-arithmetic nature of the post-processing. In contrast, when operated in a periodic mode, the shape of the resulting attractor was circular as would be expected for a single-tone periodic behavior.

Each of the four digital chaos generator systems was confirmed to be chaotic by calculating the maximum Lyapunov exponent (MLE) with 250,000 iterations each. The time evolution of the MLEs indicated that all values were positive and thus confirmed chaos. The original systems (without post-processing) have MLEs of 0.053, 0.162, 0.094, and 0.071 for the 16-bit implementations and 0.052, 0.155, 0.089 and 0.058 for the 32-bit implementations of systems 1, 2, 3, and 4, respectively. The differential post-processing systems showed an improvement with MLE values of 0.563, 0.912, 1.184, and 0.667 for systems 1, 2, 3, and 4, respectively, while the XOR post-processing systems showed the greatest improvement with values of 5.205, 5.375, 5.799 and 5.538 for systems 1, 2, 3, and 4, respectively. Post-processing improves the chaotic response by a factor in the range of about 6-10 in the differential case, and in the range of about 33-95 in the XOR case.

The effect of bus width on the MLE was also examined. Each 32-bit system was post-processed with a secondary bus width of 16, 18, 20, 22, 24, 26, 28, 30, and 31 bits for both differential and XOR post-processing operations and the corresponding MLE was determined. A general pattern of decreasing MLE with respect to bus width was observable for both post-processing types, although even the smallest precision variation of one bit between the 32-bit and 31-bit bus widths was sufficient to create a long-term divergence for chaotic behavior in each case.

Histograms of the X variable were obtained from the synthesized digital chaos generators on the Xilinx FPGA using a Tektronix oscilloscope. Differential post-processing systems exhibited a Gaussian-like distribution in X, independent of the original system distribution. The XOR post-processing results exhibited more of an irregular distribution and thus appear to be more dependent on the statistics of the original systems. However, the XOR post-processing results still showed a generally bimodal distribution irrespective of the original system distribution.

3. Experimental Results

The digital chaos generator systems were synthesized and experimentally verified on a Xilinx Virtex 4 XCS4SX35-10FF668 FPGA. This FPGA consists of 30,720 combinational 4-input LUTs, 30,720 flip-flops (FFs), and 192 DSP blocks. Each system is designed in four different ways: original without controllability, controllable with no post-processing, differential post-processing, and XOR post-processing, all with a bus width of 32 bits. The number of units uses corresponding to area utilization are shown in TABLE 6. Logic utilization ranges from 0.71% to 1.63%, register usage ranges from 0.41% to 0.71%, and DSP usage ranges from 2.08% to 5.21% of the total units available on the FPGA. The maximum clock frequency in MHz of each of these systems is also reported in TABLE 6. Systems 1 and 2 were generally faster than Systems 3 and 4 by approximately a factor of 2 due to the absence of slow multiplication operations that use the DSP blocks. Accounting for all three state variables, the overall throughput of the four systems (considering 96-bit output of three variables) is high, ranging from 4.54 Gb/S to 14.15 Gb/S.

TABLE 6

Digital chaos generator synthesis results with area utilization in units used and frequency in MHz.

| Type | Xilinx Virtex 4 | | Altera Stratix ® IV | |
|---|---|---|---|---|
| | LUT/FF/DSP | Freq. | ALUT/Reg/DSP | Freq. |
| System 1 | | | | |
| Original | 253/153/0 | 140.92 | 197/125/0 | 222.78 |
| Controllable | 253/153/0 | 141.66 | 198/125/0 | 217.63 |
| Differential | 410/214/0 | 142.96 | 346/282/0 | 229.25 |
| XOR | 404/212/0 | 141.50 | 343/282/0 | 238.66 |
| System 2 | | | | |
| Original | 217/125/0 | 146.95 | 188/97/0 | 230.57 |
| Controllable | 218/125/0 | 147.38 | 218/97/0 | 234.25 |
| Differential | 354/173/0 | 139.88 | 327/241/0 | 225.53 |
| XOR | 348/171/0 | 142.41 | 324/241/0 | 223.61 |
| System 3 | | | | |
| Original | 282/155/4 | 51.53 | 223/127/4 | 126.09 |
| Controllable | 282/155/4 | 53.10 | 223/127/4 | 126.92 |
| Differential | 452/218/5 | 52.19 | 382/286/6 | 126.71 |
| XOR | 446/216/5 | 51.12 | 379/286/6 | 126.18 |
| System 4 | | | | |
| Original | 314/124/8 | 49.71 | 348/96/8 | 107.56 |
| Controllable | 314/124/8 | 49.19 | 349/96/8 | 103.18 |
| Differential | 500/172/10 | 47.32 | 568/240/12 | 108.93 |
| XOR | 494/170/10 | 48.45 | 565/240/12 | 108.14 |

The four digital chaos generator designs were also synthesized on an Altera Stratix® IV EP4SGX530 KH40C2 FPGA, consisting of 424,960 combinational ALUTs, 424,960 registers, and 1,024 DSP blocks. TABLE 6 shows logic utilization ranging from 0.044% to 0.134%, register usage ranging from 0.023% to 0.067%, and DSP usage ranging from 0% to 0.011% of the total units available on the FPGA. The overall throughput of the four systems ranges from 9.91 Gb/S to 22.91 Gb/S. Systems performance was much faster (about twice the throughput) on the more sophisticated Altera Stratix® IV FPGA. Due to the pipelined architecture of the digital systems, enhancements such as post-processing and controllability do not significantly impact performance. Controllability in particular involves a minimal hardware overhead as only extra multiplexors are required. Post-processing incurs a more substantial hardware penalty due to the use of two parallel systems and output logic, leading to a tradeoff between chaotic response and area footprint.

4. Additive Chaos

Figure 18:
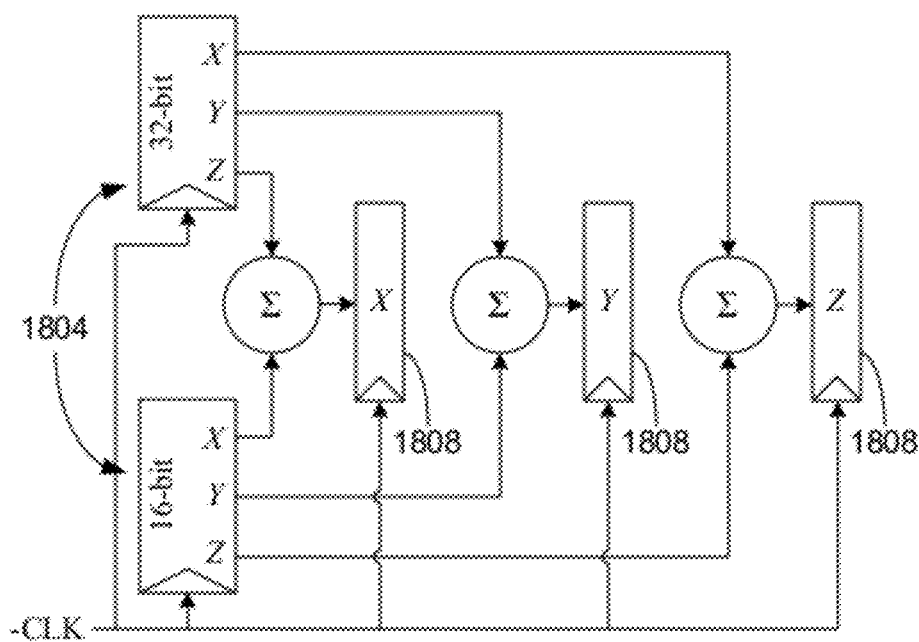

In some embodiments, additional chaos may be added to a digital chaos generator by combining the 16-bit and 32-bit outputs. Referring to FIG. 18, shown is a schematic block diagram illustrating an example of additive post-processing of the chaos generator outputs. The outputs of the 16-bit and 32-bit systems may be added together to create a new chaotic system. With both implementations utilizing the same number of bits for the integer portion, the addition may be done digitally with the 16-bit output zero-padded to 32-bits. The equations describing this additive post-processing are as follows:

$$X = X_{32} + X_{16} \qquad \text{EQN. 23}$$

$$Y = Y_{32} + Y_{16} \qquad \text{EQN. 24}$$

$$Z = Z_{32} + Z_{16} \qquad \text{EQN. 25}$$

Such architecture can be implemented without much additional overhead to the fully digital systems. The two sub-blocks 1804 for the 16-bit and 32-bit systems may be a digital chaos generator such as, e.g., the example of FIG. 17 or other appropriate digital design. The two results for variables X, Y, and Z are added and sent to registers for synchronous output. The output of this system is 32-bits wide, reflecting the larger of the two input bus widths. In other embodiments, rather than summing the 16-bit and 32-bit outputs, bitwise-XOR and/or subtraction (SUB) may be used to combine the 16-bit and 32-bit outputs to create a new chaotic system.

i. Chaotic Response

The additive post-processing was implemented and evaluated using system 2 of EQNS 16 and 17. The system and variants are designed using Verilog HDL and attractors or phasor trajectory diagrams of the digital chaos generator output were generated. Visual inspection of the attractors indicated chaotic behavior and showed chaotic trajectories within bounded areas. As noted above, the original 16-bit and 32-bit systems notably show a behavior similar to a Chua double-scroll attractor. The additive post-processing system has characteristics similar to a triple-scroll attractor.

The MLE was calculated for the digital chaos generator time series with additive post-processing. The MLE was found to yield an improved chaotic response over that of the 16-bit and 32-bit implementations without post processing. The positive value of the exponent confirms the chaotic behavior of the generated output.

ii. Experimental Results

The system was synthesized using the Quartus II package on an Altera Stratix® IV EP4SGX530 KH40C2 FPGA. The signum nonlinearity jerk-equation system (EQNS. 16-17, system 2) was designed using 16-bit and 32-bit bus widths. The additive system consisted of an adder unit for each state variable that sums the 16-bit and 32-bit outputs and before providing to registers for synchronization of the outputs. The results in area utilization, frequency, and throughput after synthesis are given in TABLE 7. Area usage was measured on the basis of logic utilization and number of registers only. None of the DSP blocks or memory units were used.

TABLE 7

Area utilization, frequency, and throughput results after synthesis of digital chaos generator on Altera Stratix ® IV FPGA.

| System | Logic (units) | Registers (units) | Frequency (MHz) | Throughput (Gbits/S) |
|---|---|---|---|---|
| 16-bit | 92 | 49 | 303.86 | 14.59 |
| 32-bit | 188 | 97 | 224.47 | 21.55 |
| Additive | 327 | 241 | 223.46 | 21.45 |

The designs exhibit compact area, with logic utilization ranging from 0.022% to 0.77% and register usage ranging from 0.012% to 0.057% of the total units available on the FPGA. The 16-bit system shows the highest clock frequency at 303.86 MHz, while the other two systems have a similar maximum throughput of 21.55 Gbits/S. The additive system requires an area penalty because the system is implemented in both 16-bit and 32-bit formats and includes the additional adders and registers. However, the enhanced chaotic behavior as demonstrated by the increase in the MLE can justify the added cost. The three digitally designed subsystems were simulated for 2,000,000 iterations and the statistical distributions of the output values were shown as histograms. The original 16-bit and 32-bit systems (without post-processing) indicated a bimodal distribution concentrated at the centers of the two scrolls, while the digital chaos generator with post processing exhibited a more Gaussian-like distribution.

D. Multi-Scroll Butterfly Attractor

As discussed previously, a Lorenz butterfly chaotic attractor is a well-known chaotic system. The Lorenz attractor may be modified to produce a multi-scroll attractor based on a nonlinear staircase function, which can be used within a digital chaos generator to produce a chaotic output. No external inputs are needed to move from one scroll to another. Rather, the output shifts between the multiple scrolls in a chaotic manner. The multi-scroll attractor can be shaped into a variety of symmetrical and unsymmetrical shapes, including V-shaped and Heart-shaped patterns. The number of scrolls may also be controlled using the parameters of the system. This controlled multi-scroll attractor can be used to generate random signals with a predefined symbol distribution.

Figure 19:
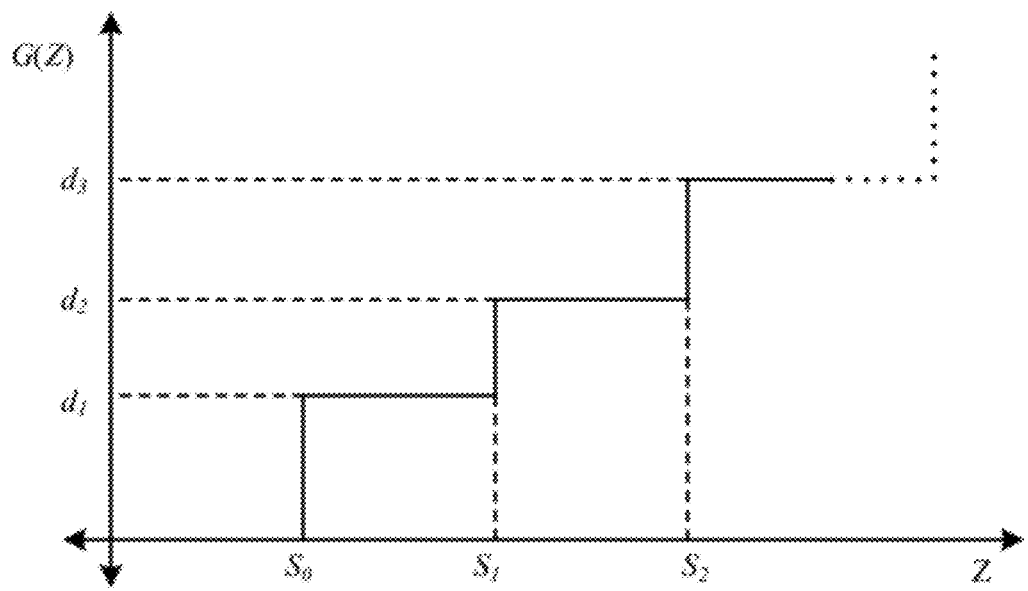
FIG. 19 is a plot of an example of a nonlinear staircase function in accordance with various embodiments of the present disclosure.

The time series output of digital chaos generator can be controlled to have either a shifting DC bias or a variable amplitude by moving between different scrolls of the attractor. The proposed multi-scroll system is based on a modified Lorenz butterfly, which is defined as:

$$\dot{X}=a(Y-X) \quad \text{EQN. 26}$$

$$\dot{Y}=\text{sign}(X)(b-Z) \quad \text{EQN. 27}$$

$$\dot{Z}=|X|-cZ \quad \text{EQN. 28}$$

where $\dot{X}$, $\dot{Y}$ and $\dot{Z}$ are the differential equations defining the system, and a, b and c are the parameters of the system. This system may be transformed to a multi-scroll scheme by setting a=1, c=0.5, and modifying EQN. 27 using a nonlinear staircase function as follows:

$$\dot{Y}=\text{sign}(X)[1-mZ+G(Z)] \quad \text{EQN. 29}$$

where m is an added parameter to the system and G(Z) is the nonlinear function responsible for producing the multi-scroll effect. The nonlinear staircase function G(Z) is defined as a piecewise step function, such as:

$$G(Z) = \begin{cases} 0 & Z < S_0 \\ d_1 & S_0 \le Z < S_1 \\ \vdots & \vdots \\ d_{N-1} & Z \ge S_{N-1} \end{cases} \quad \text{EQN. 30}$$

where $d_i$ is the additive coefficient and $S_i$ is the limiting coefficient. The piecewise nonlinear equation is a multiple-step function resembling the shape of stairs, as shown in FIG. 19 where the number of scrolls of the attractor is 2N.

1. Controlling Attractor Shape

Figure 20:
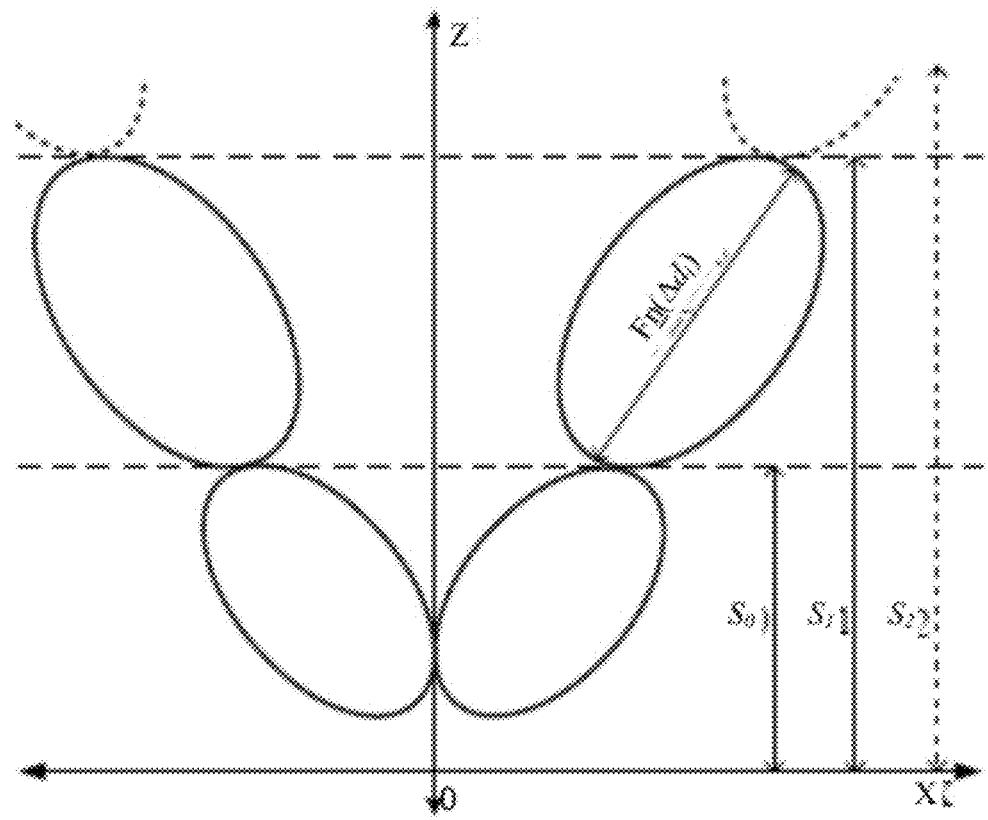
FIG. 20 is a plot of a V-shape multi-scroll attractor in accordance with various embodiments of the present disclosure.

The shape of the attractor is mainly controlled by the coefficients $d_i$, $S_i$, and m. Using these parameters, a variety of attractors can be produced to generate a chaotic output. Referring to FIG. 20, shown is a V-shape attractor illustrating the effect of the additive and limiting coefficients ($\Delta d_i$ and $S_i$) on the shape of a chaos generator output. The additive coefficients ($d_i$) control the size of the generated scrolls by following governing equation:

$$\Delta d_k = d_k - \sum_{i=1}^{k-1} d_i \quad \text{EQN. 31}$$

where k=(1, 2, . . . , N−1). The limiting coefficients ($S_i$) define the boundaries at which the system shifts from one scroll to another and can be set to limit the scrolls at an upper edge. The parameters should be selected to terminate each scroll at the desired position.

i. Symmetrical V-Shape Attractor

A V-shape multi-scroll attractor can be achieved by selecting the system parameters such that all the scrolls possess the same size. These equal sized scrolls are generated by setting the ($d_i$) coefficients to:

$$\Delta d_k = a, \forall k \quad \text{EQN. 32}$$

where a is a constant that is set to produce scrolls of the same size of the original two scrolls. The $S_i$ parameters will in turn have a constant difference between each two successive parameters, such that:

$$s_{k+1}-s_k = s_k - s_{k-1}, \forall k \quad \text{EQN. 33}$$

Figure 21:
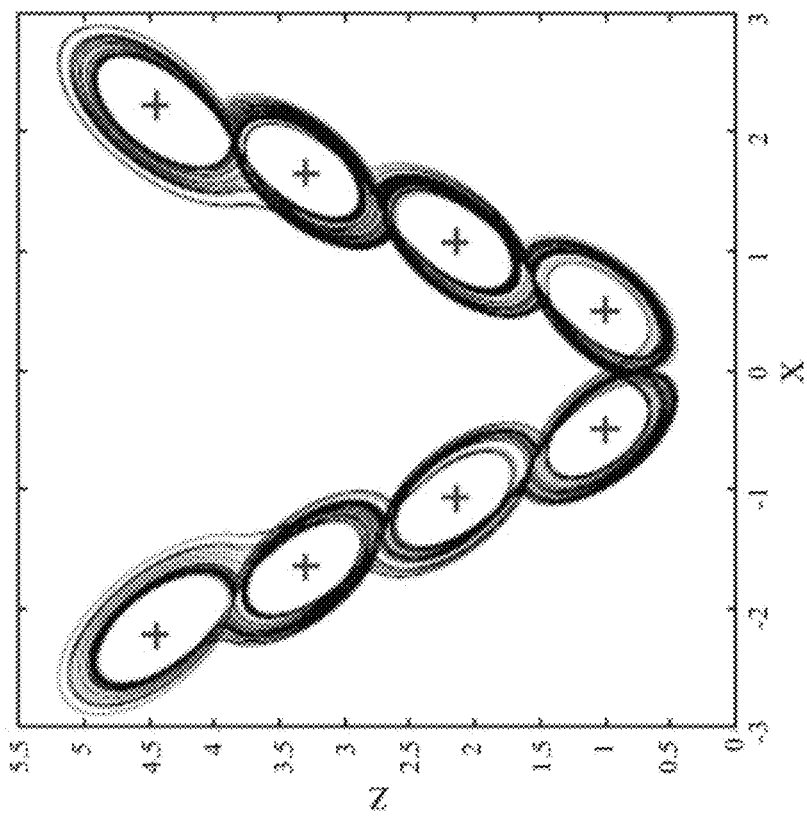

For example, a V-shape attractor with four levels of symmetrical scrolls of the same size may be produced using N=4, m=1, $d_1$=1.15, $d_2$=2.3, $d_3$=3.45, $S_0$=1.56, $S_1$=2.7115, and $S_2$=3.863 as illustrated in FIG. 21.

ii. Symmetrical Heart-Shape Attractor

Figure 22:
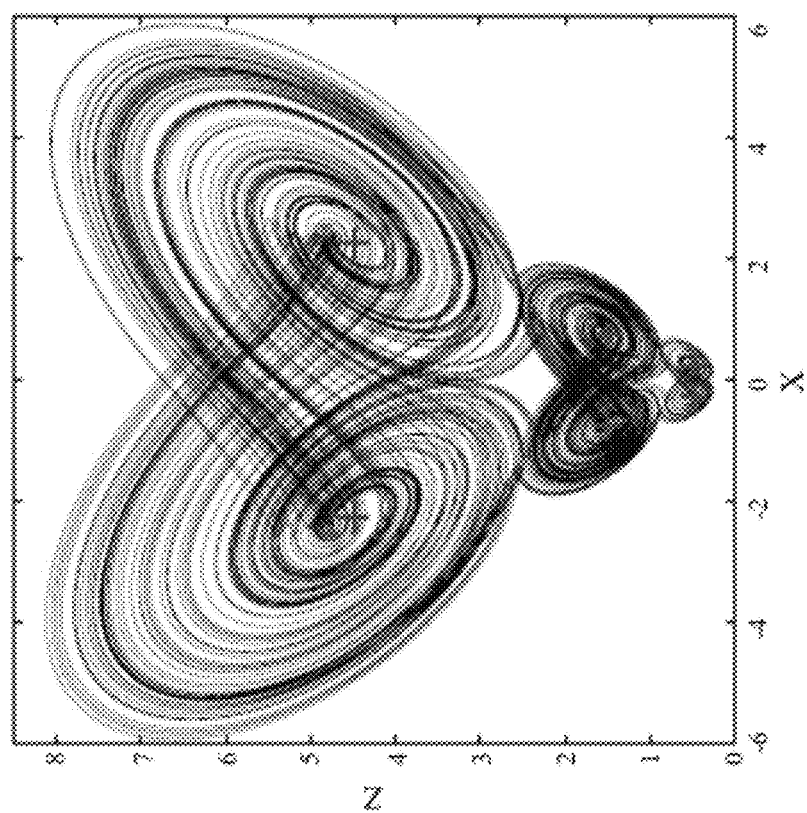
FIGS. 21-23 are plots illustrating examples of V-shape and heart-shape multi-scroll attractors in accordance with various embodiments of the present disclosure.

A heart-shape may be produced by setting the parameter m=2. This amplifies of the effect of the variable Z in EQN. 29, which changes the shape of the attractor significantly. The attractor takes on the shape of a family of interconnected scroll pairs rather than a group of adjacent parabolic rings as in the V-shape. For example, a heart-shape attractor with three levels of interconnected scrolls may be produced using N=3, m=2, $d_1$=2, $d_2$=8, $S_0$=0.865, and $S_1$=2.53 as illustrated in FIG. 22.

iii. Asymmetrical Attractors

Figure 23:
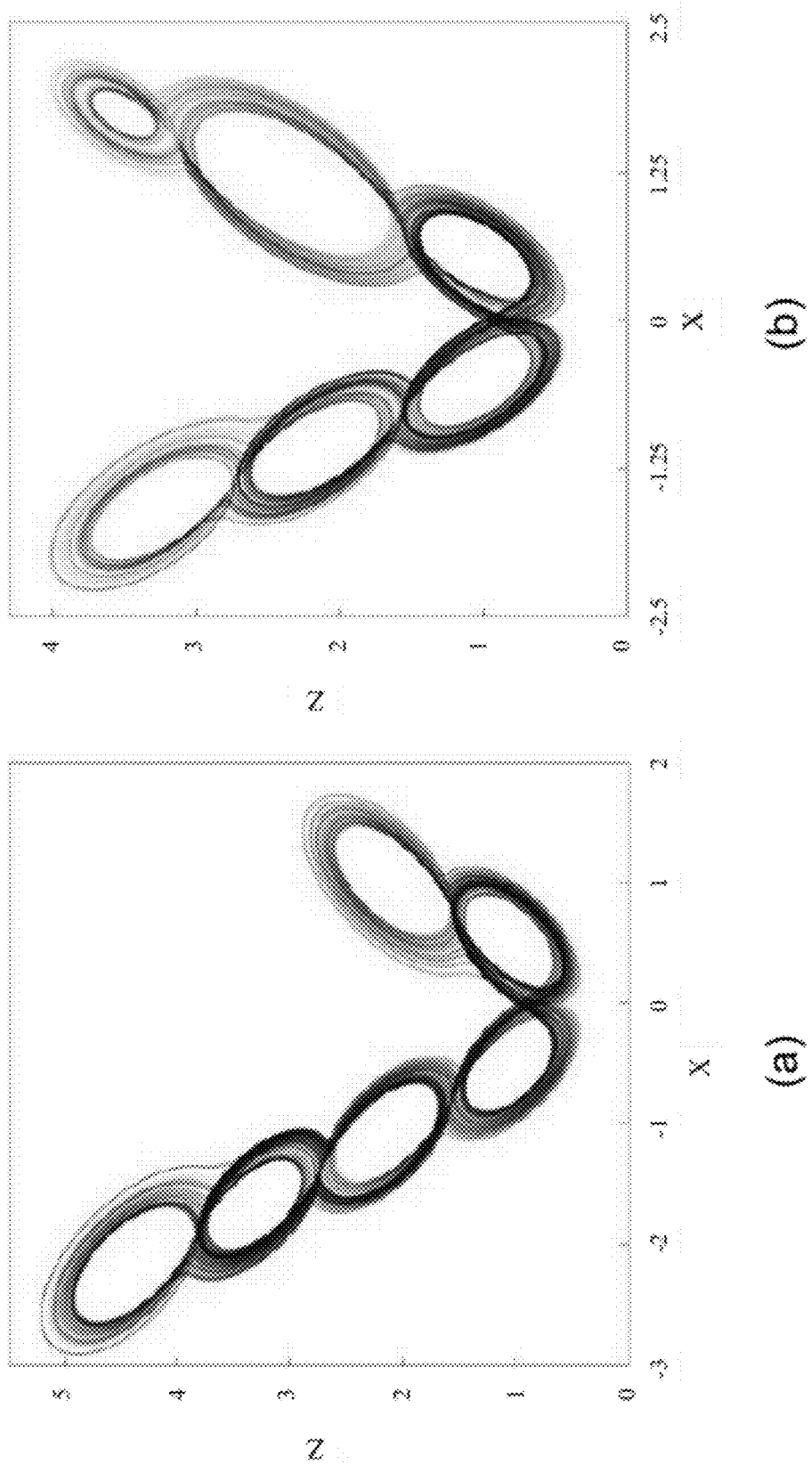

An extra degree of freedom in shaping the attractor may be added by extending the nonlinearity to be a function in X and Z simultaneously. EQN. 27 can be refined as follows:

$$\dot{Y}=\text{sign}(X)(b-mZ+H(X,Z)) \quad \text{EQN. 34}$$

and H is given by:

$$H(X, Z) = \begin{cases} G^-(Z) & X < 0 \\ G^+(Z) & X \geq 0 \end{cases} \qquad \text{EQN. 35}$$

where $G^+(Z)$ and $G^-(Z)$ are two instances of EQN. 30. In EQN. 34, a different control is defined for the scrolls lying on the positive and negative parts of the X-axis. The modifications introduced in EQN. 34 allow the attractors to have different scroll shapes and numbers on the opposite sides of X-axis. For example, asymmetrical V-shape attractors may be created with a different number of equal size scrolls as illustrated in FIG. 23(a), an equal number of different size scrolls as illustrated in FIG. 23(b), or a different number of different sized scrolls.

iv. Maximum Lyapunov Exponent

Verification of chaotic output was confirmed by calculating the MLE of a symmetrical V-shape attractor and an asymmetrical V-shape attractor with four scrolls on the left side and two scrolls on the right side. The MLEs were calculated with a time series containing more than 245,000 iterations resulting in saturation at 0.0288 and 0.0497, respectively. The positive MLE values confirm the chaotic behavior of the attractors with the asymmetrical V-shape attractor being more chaotic.

2. Digital Implementation

Figure 24:
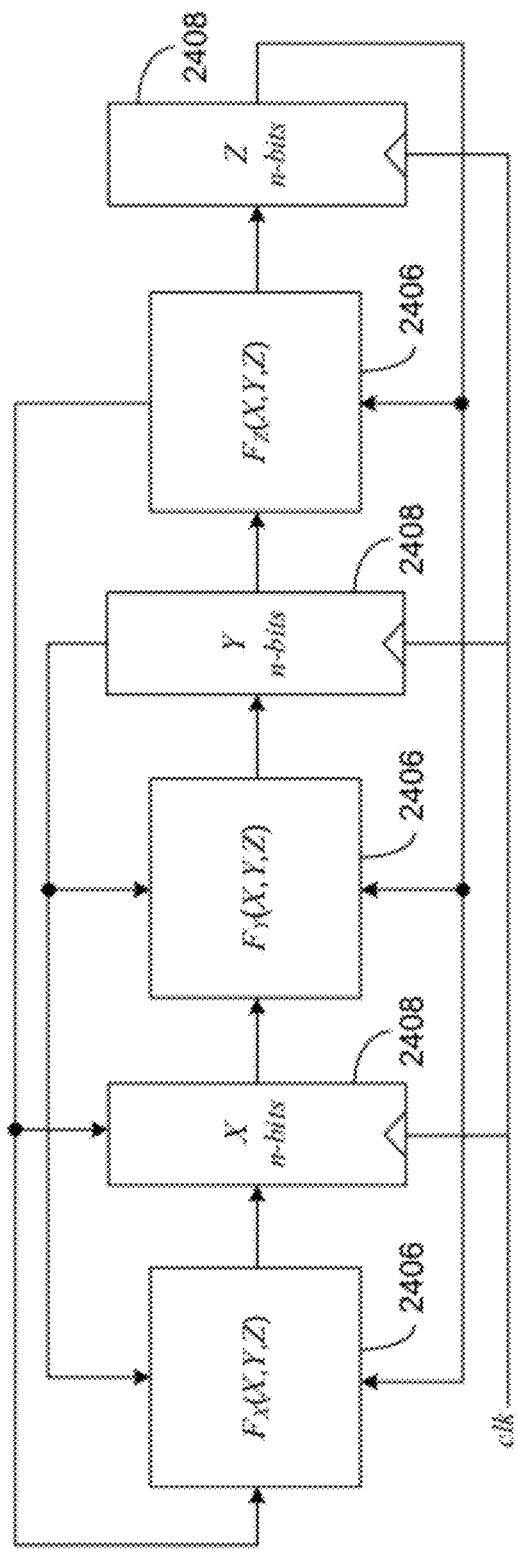
FIGS. 24-27 are schematic block diagrams illustrating examples of digital realizations of chaos generators for generating a chaotic output in accordance with various embodiments of the present disclosure.

A chaos generator can digitally implemented by realizing a numerical solution of a nonlinear differential equation as, e.g., a nonlinear feedback pipeline. Registers are used to store the state of the system, while the solution can be implemented as combinational circuits. FIG. 24 shows an example of the general architecture of a third-order differential-equation based digital chaos generator. Combinational blocks (or digital logic modules) 2406 provide the numerical solution of state variables X, Y, and Z based upon $F_X(X,Y,Z)$, $F_Y(X,Y,Z)$, and $F_Z(X,Y,Z)$. As can be seen the system state variables X, Y, and Z are stored into three n-bit registers 2408, where n is the number of bits used to represent numbers in the digital system. The registers are updated with the new state at each positive clock cycle. The area and the delay of the system may be improved by using a variety of techniques. For example, multiplication may be eliminated by choosing constants that are a power of two, thereby replacing the area consuming multiplication operations with simple shift operations. The time step h may be set to $h=2^r$, where r is an integer (e.g., r=4).

Figure 25:
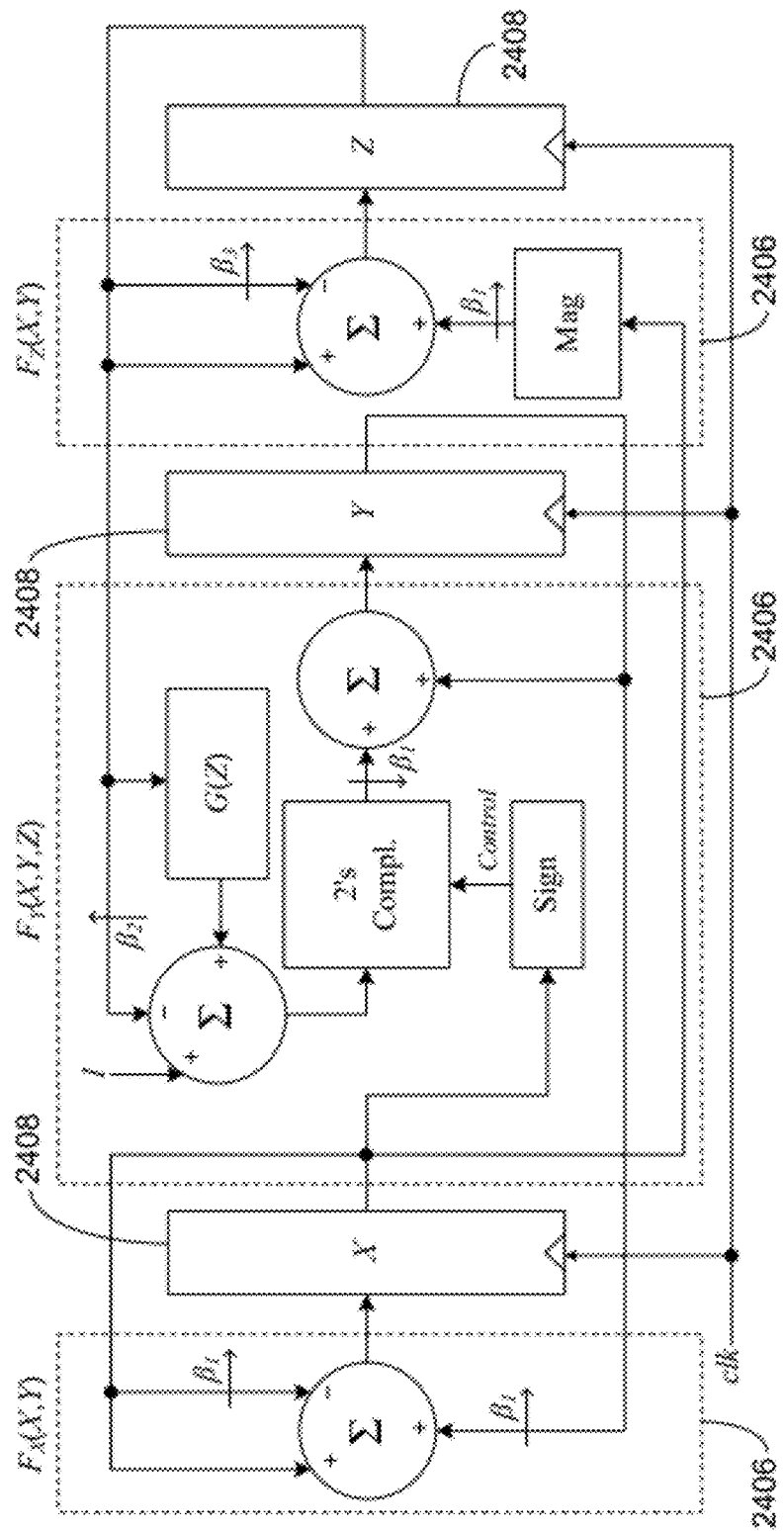

Referring next to FIG. 25, shown is an embodiment of the digital chaos generator that was implemented based upon solving EQNS. 26, 28, and 29 using the Euler method:

$$F_x(X,Y) = X_{t+h} = X_t + h(Y_t - x_t) \qquad \text{EQN. 36}$$

$$F_y(X,Y,Z) = Y_{t+h} = Y_t + h\text{sign}(X_t)[b - mZ_t + G(X_t)] \qquad \text{EQN. 37}$$

$$F_z(X,Z) = Z_{t+h} = Z_t + h(|X_t| - 0.5Z_t) \qquad \text{EQN. 38}$$

where t is the time and h is the time step. The other constant m may be set to a value of one or two. The state variables X, Y, and Z are realized as n-bit registers 2408, where n is the number of bits used to represent numbers in the digital system. The registers are updated with the new state at each positive clock cycle from digital logic modules 2406.

The function $F_X(X,Y)$ given by EQN. 36 is implemented as a multi-input adder circuit, with X added to a shifted version of Y and −X. The bottleneck of the system which describes the $F_Y(X,Y,Z)$ function is EQN. 37, which includes the evaluation of the proposed nonlinear function G(Z). The calculated G(Z) is then added to '1' and subtracted from a shifted version of Z. The output of this operation, i.e., the expression $[b-mZ_t+G(X)]$ is multiplied by sign $(X_t)$, which is equivalent to a two's complement circuit with the sign $(X_t)$ as "enable". Then, Y is added to a shifted version of the two's complement output. The last expression $F_Z(X,Y)$, given by EQN. 38, is finally evaluated by calculating the summation of Z, shifted version of Z, and the shifted version of |X|.

Asymmetrical attractors are implemented by realizing the nonlinear function H(X,Z) in EQN. 35. The implementation of this expression may be carried out by multiplexing two versions of G(Z) for the positive and negative values of X, where the MUX selection line is the sign bit of X.

The outputs of the digital chaos generator are within bounded intervals, which saves the shape of the attractor. Therefore, fixed-point number representation is suitable for system realization. This selection will reduce the area required and delay significantly. Distribution of 32 bits can be used within the system. Selection was governed by the bounding interval of the multi-scroll output, the bounding interval of the intermediate results, and the effect of the negative shift of the parameter (h). The 32-bits are distributed such that the highest significant bytes are reserved for the two's complement integer portion and the rest of the bits are used for the fractional portion as illustrated in FIG. 12.

Figure 26:
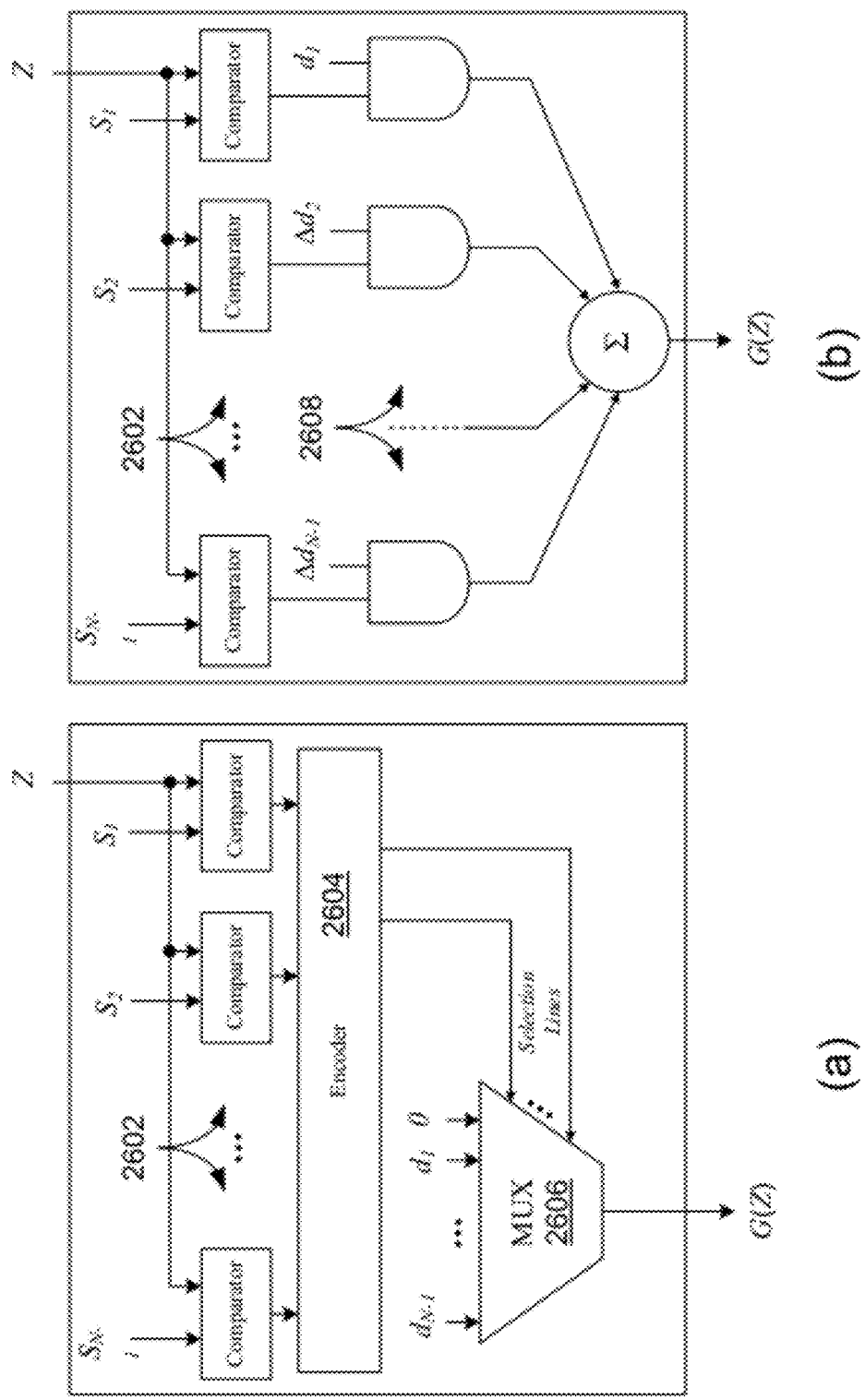

The piecewise nonlinear function G(Z), given by EQN. 30, can be implemented as, e.g., a series of comparators along with a multiplexer (MUX). Referring to FIG. 26, shown are examples of realizations of the nonlinear function G(Z). In FIG. 26(a), parallel comparators 2602 are used and their outputs are encoded by encoder 2604 to drive the selection lines of the MUX 2606. Based on the selection input, the MUX will select from the set of $(0, d_1, \ldots, d_{N-1})$.

The nonlinear function G(Z) may also be redefined as:

$$G(Z) = \frac{1}{2} \sum_{i=0}^{N} \Delta d_i * (\text{sign}(Z-s) + 1) \qquad \text{EQN. 39}$$

where $\Delta d_0 = 0$. With the redefined nonlinear function of EQN. 39, another implementation may be provided as illustrated in FIG. 26(b), where the $\Delta d$ parameters are used to shape the attractor directly (rather than d). Parallel comparators 2602 are used and their outputs are supplied to along with the $\Delta d$ parameters logic gates 2608. The outputs of the logic gates 2608 are summed to provide the nonlinear function. The usage of $\Delta d$ eases the shaping of the attractor because it directly affects the size of each scroll as illustrated in FIG. 20.

Figure 27:
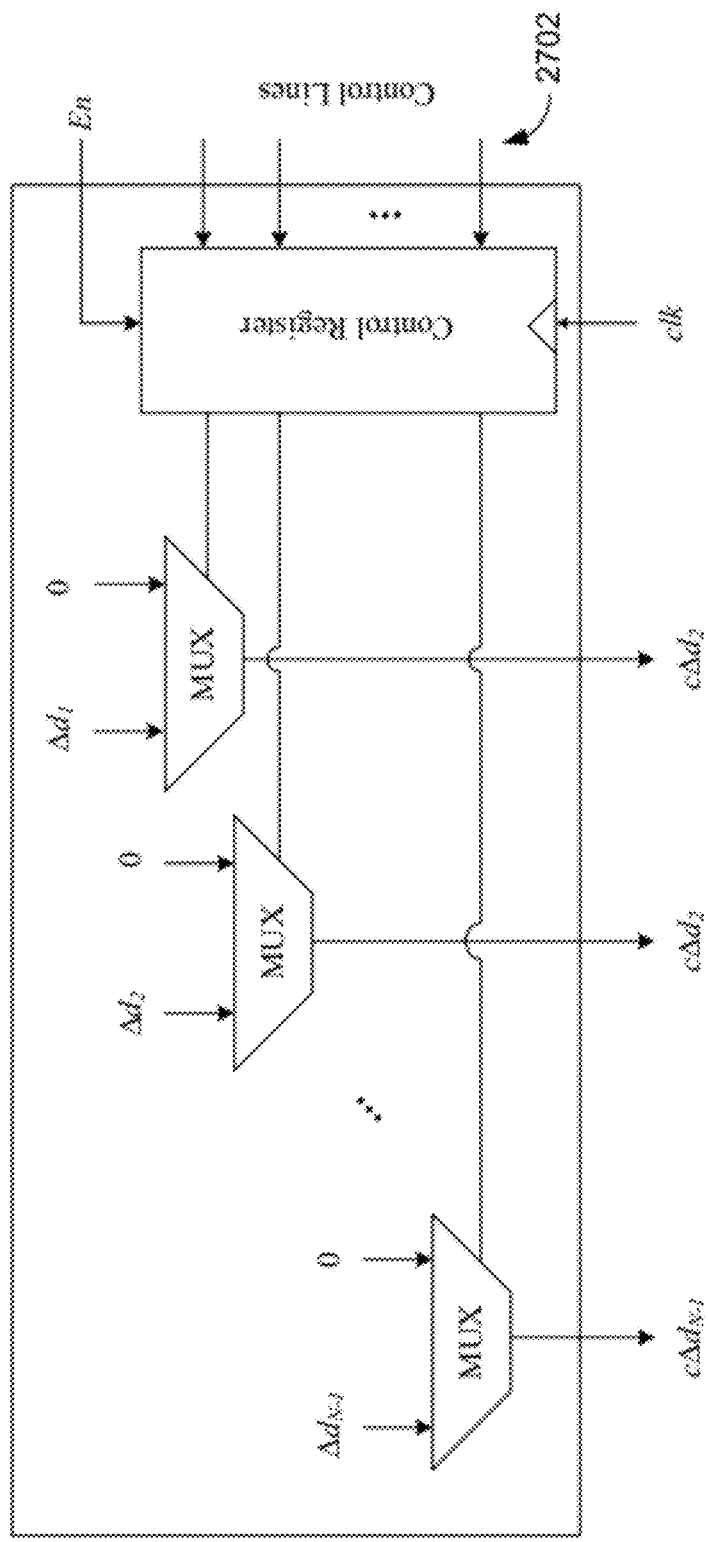

The shape of the generated output may be controlled based on determining which scrolls are to be generated and the size of each scroll. FIG. 27 shows an example of a circuit that is capable of controlling the scroll generation. The circuit is configured to enable or disable the $\Delta d$ variables based upon an external input. Referring to EQN. 39, it can be seen that the number of scrolls may be limited by setting the higher order $\Delta d$ parameters to zero. Enabling the $\Delta d$ parameters could be fully controlled by a user simply by using the control lines 2702 to select the outputs as shown in FIG. 27. Further, the circuit may be configured to control the selected output based upon a selected number of scrolls that is specified by the user. This number of scrolls may be internally decoded by the circuit to enable the appropriate control lines 2702.

The control may be extended by registering the values of Δd from an external input. This embodiment will enable controlling the size of scrolls in addition to its number. It should be noted that changing the values of the additive coefficients Δd may also require resetting the limiting coefficients $S_i$. Finally, the shape of the attractor may be selected between V-shapes and heart-shapes by setting the value of the parameter m.

3. Experimental Results

A digital chaos generator based upon multi-scroll attractors was implemented in Verilog VHDL and realized on a Xilinx Virtex® 4 XC4VSX35 FPGA. During the simulation phase, Xilinx ISE 11 and the GNU iVerilog software were used. Attractors, time diagrams, and histograms are captured using the TekTronix™ MSO 414 mixed signal oscilloscope. All the circuits were synthesized using Xilinx ISE 11, with the optimized for time (speed) option selected.

The implemented digital circuits exhibited small area and high throughput. The area and speed were calculated with the variables X and Z used as the output ports. Symmetric V-shape implementations for 4, 6, 8, and 12 scrolls were examined as well as V-shape attractors with different scrolls' sizes, which were controlled using Δd. For example, the results showed that a heart-shape attractor with 6 scrolls was capable of reaching a maximum frequency of 134.7 MHz with a throughput of 4.3 Gb/s with less than 1.5% of the total area of the FPGA being used. In addition, heart-shape attractors with 4 and 6 scrolls were examined with the parameter m=2.

The time series output of various implementations was captured with the oscilloscope, for the variable (X). V-shape time responses showed that the DC value of the oscillation changes as the attractor shifted from one scroll to another. On the other hand, the amplitude of the oscillation changed when the attractor moved between scrolls in the heart-shape attractor. The time series output reveals the number of scrolls within the system as different DC levels for V-shape or different oscillation amplitudes in heart-shape. In the case of an unbalanced V-Shape attractor, a nonzero total DC bias was exhibited for the time series of the variable (X). Histograms of the output exhibited a variety of shapes depending mainly upon the shape of the generated attractor. As such, the histogram may be shaped for an application by controlling the shape of the attractor.

E. One Dimensional Multi-Scroll Chaos Attractor

In another embodiment, the fully digital chaos generator of FIG. 17 may also be utilized to implement a jerk-equation based chaotic ODE with a staircase nonlinear function N(X) and a single system parameter $a_{sys}$ to yield one dimensional (1D) multi-scroll chaos including a single series of scrolls in an X-direction using an Euler approximation. The proposed multi-scroll system is defined as:

$$\dot{Z} = \ddot{Y} = \dddot{X} = J(X, Y, Z) \qquad \text{EQN. 40}$$

$$J(X, Y, Z) = a_{sys}[N(X) - X - Y - Z] \qquad \text{EQN. 41}$$

$$N(X) = \text{sgn}(X) + \sum_{j=1}^{M} [\text{sgn}(X - 2j) + \text{sgn}(X + 2j)] \qquad \text{EQN. 42}$$

The system may be digitized as a non-linear feedback pipeline where registers 1708 store state variables {X,Y,Z} and calculations are done through combinational logic (digital logic modules 1706). The Euler approximation (with step-size $h_{eul}$) can be applied to each of the first order systems as given by:

$$X_{t+h} = X_t + h_{eul} Y_t \qquad \text{EQN. 43}$$

$$Y_{t+h} = Y_t + h_{eul} Z_t \qquad \text{EQN. 44}$$

$$Z_{t+h} = Z_t + h_{eul} J(X_t, Y_t, Z_t) \qquad \text{EQN. 45}$$

The non-linear term N(X) may be predetermined and stored in a separate register to optimize the performance by easing the computational bottleneck at the input of the Z-register 1708. A 32-bit two's complement fixed-point format may be used with the 8 most significant bits for sign and integer part and the remaining 24 bits for the fractional part. In some implementations, initial conditions such as {X=0, Y=0.5, Z=0.5} may be used.

The original system from EQNS. 40-42 yields only even numbers of scrolls as per the determined equilibrium points (m,0,0) where m=0, ±1, ±3, ..., ±(2M−1). To enable odd numbers of scrolls by manipulation of individual break-points, the implementation of the staircase function consists of odd valued lower and upper bound parameters (L & U respectively) on a standard function rather than iterative summation of signum functions as shown in EQN. 42. This approach also enables the real-time controllability of both the position of the scrolls in the X-direction and number of scrolls (specified by the difference in upper and lower bounds). The functional form of the staircase can be modified to:

$$N_{L,U}(X) = \begin{cases} U & X \in (U, \infty) \\ L & X \in (-\infty, L) \\ \text{flr}(X) & X \in [L, U], \text{flr}(X) \text{ odd} \\ \text{flr}(X) + 1 & X \in [L, U], \text{flr}(X) \text{ even} \end{cases} \qquad \text{EQN. 46}$$

Only the most significant 7-bits of the integer part are needed for computation. Eliminating the fractional bits effectively yields flr(X) which rounds X towards −1. The output NX is one-padded by 1 bit and zero-padded by 24 bits on the least significant side to yield odd-valued integer results. This yields the relationship between the control parameters $(L_B, U_B)$, the effective bounds (L,U) and the number of scrolls $N_{scrolls}$ as:

$$(L, U) = (2L_B + 1, 2U_B + 1) \qquad \text{EQN. 47}$$

$$N_{scrolls} = N_{break-points} = U_B - L_B + 1, U_B > L_B \qquad \text{EQN. 48}$$

Both $L_B$ and $U_B$ are 7-bits wide (signed) and represent the break-points and centers of the scrolls at both ends. Due to limitations of overflow, the maximum possible number of scrolls is thus $2^7 - 2 = 126$ scrolls. Furthermore, since the upper bound must be greater than the lower bound and because the end-points are disallowed, the total legal combinations of $L_B$ and $U_B$ are given by:

$$N_{comb} = (2^7 - 3) + (2^7 - 4) + \ldots + 1 = 7875 \qquad \text{EQN. 49}$$

To provide further controllability, the system parameter and Euler step size may be implemented with multipliers. Both the step size and the system parameter are designed as unsigned integers with 4-bit bus widths enabling 24×24=256 different combinations for the same $(L_B, U_B)$. Since the most significant 32-bits are taken from the 36-bit output of the multiplier, the result is effectively already right-shifted by 4 bits and must be subsequently accounted for. Constants p and q specify arithmetic right-shifts to further scale the multiplier output and provide a scaled base value when the 4-bit input is zero, respectively. Since these are hard-coded shifts that only rewire buses, they do not require any additional hardware.

Euler Multipliers: Constants p and q may be chosen, e.g., as 2 and 5 respectively such that the full Euler step size is:

$$h_{eul}=2^{-5}+2^{-6}h \quad h=0,1,2,\ldots,15. \quad \text{EQN. 50}$$

Parameter Multiplier: Since the valid range of chaotic parameters for this system is $a_{sys} \in [0.47,1]$, p and q are both chosen as 1 such that the overall system parameter is:

$$a_{sys}=2^{-1}+2^{-5}a \quad a=0,1,2,\ldots,15. \quad \text{EQN. 51}$$

Attractors or phasor trajectory diagrams of the digital chaos generator output were generated to examine the chaotic output behavior. The number of scrolls may be adjusted by changing the value of $U_B$. Scrolls may be shifted in the X-direction by incrementing $L_B$ and $U_B$ by the same amount. Variations in the system parameter $a_{sys}$ or the Euler step size $h_{eul}$ maintain the number of scrolls but modify the shape. All systems exhibited excellent chaotic characteristics upon visual inspection. The system was shown to be chaotic under variation of every parameter by calculating the MLE over 250,000 iterations. The positive values of the MLE confirmed the chaotic behavior of the generated data. The MLE was shown to increase with an increase in the number of scrolls or the Euler step size, increase with a decrease in the system parameter, and remain largely invariant with respect to scroll position. The implementation is compact with a demonstrated throughput up to 3.33 Gbits/S on a Xilinx Virtex 4 FPGA and simulated up to 4.84 Gbits/S on an Altera Stratix® IV FPGA.

E. Multidimensional Multi-Scroll Chaos Attractor

In other embodiments, a jerk-equation based chaotic ODE may be implemented with a fully digital chaos generator such as that illustrated in FIG. 2 to generate multidimensional multi-scroll chaos. A one dimensional (1D) multi-scroll chaotic system may be described by the following system of three first-order ODEs:

$$\dot{X}=Y \quad \text{EQN. 52}$$

$$\dot{Y}=Z \quad \text{EQN. 53}$$

$$\dot{Z}=-a[Z+Y+F(X)] \quad \text{EQN. 54}$$

where F(X) represents a sawtooth nonlinearity. This may be generalized to multiple dimensions by introducing nonlinear functions in Y and Z. Therefore, two dimensional (2D) multi-scroll chaos will emerge from:

$$\dot{X}=F(Y) \quad \text{EQN. 55}$$

$$\dot{Y}=Z \quad \text{EQN. 56}$$

$$\dot{Z}=-\alpha[Z+F(Y)+F(X)] \quad \text{EQN. 57}$$

and three dimensional (3D) multi-scroll chaos will be described by:

$$\dot{X}=F(Y) \quad \text{EQN. 58}$$

$$\dot{Y}=F(Z) \quad \text{EQN. 59}$$

$$\dot{Z}=-\alpha[F(Z)+F(Y)+F(X)] \quad \text{EQN. 60}$$

By generalizing all three cases such that $\dot{X}=U(Y)$, $\dot{Y}=V(Z)$, $\dot{Z}=W(X,Y,Z)$ the Euler approximation (with step size h) is applied to yield the numerical solution:

$$X_{t+h}=X_t+hU(Y_t)=P(X,Y) \quad \text{EQN. 61}$$

$$Y_{t+h}=Y_t+hV(Z_t)=Q(Y,Z) \quad \text{EQN. 62}$$

$$Z_{t+h}=Z_t+hW(X_t,Y_t,Z_t)=R(X,Y,Z) \quad \text{EQN. 63}$$

where P(X,Y), Q(Y,Z), and R(X,Y,Z) corresponds to F(X,Y), G(Y,Z), and H(X,Y,Z) of the generalized system of FIG. 2.

Registers {X,Y,Z} store the state of the system while computation is completed through combinational logic units in P(X,Y), Q(Y,Z), and R(X,Y,Z). To optimize throughput, the nonlinear function(s) for 1D, 2D or 3D multi-scroll chaos may be predetermined and stored in temporary register(s) and some of the computation for the new state of the Z-register may also be predetermined to ease the bottleneck. A 32-bit fixed-point two's complement representation may be used for all computation with 4 bits allocated to the sign and integer part and the remaining 28 bits to the fractional part.

The step-size h may be constrained to $2^{-3}$ to simplify the scalar multiplication to an arithmetic right-shift that requires no hardware. The system parameter a may be chosen to be 0.875 for optimum chaotic output and 0.875×A is realized by subtracting 0.125×A (arithmetic right-shifted by 3) from A, through a single subtractor.

To maximize performance and minimize area, the number of scrolls in 1D, 2D or 3D space may be controllable by fixing the lower bound and having a controllable upper bound. This may be accomplished by preserving the low 27 bits of X while the remaining 5 bits are all the inversion of the most significant fractional bit. Costly subtraction operations may thus be eliminated in favor of only 5 inverters. Lower and upper bounds (L and U) of the sawtooth function enable control of the position and number of scrolls in real-time. The expression may thus be recast as:

$$F(X) = \begin{cases} X-U-0.5 & X \in (U+0.5, \infty) \\ X-L-0.5 & X \in (-\infty, L+0.5) \\ X-flr(X)-0.5 & X \in [L,U] \end{cases} \quad \text{EQN. 64}$$

When implemented in hardware, the lower and upper bounds can be integer-valued, with the lower bound fixed to be L=−6 while the controllable upper bound is 3-bits wide ($U \in [-4,3]$), one less than the integer width to prevent chances of overflow. One-padding to the right by 1 bit enables addition of 0.5 without any hardware. The upper bound is also sign extended by 1-bit to match the integer width.

Break-points of the chaotic system may be calculated by finding the solution to the set of ODEs in steady-state, i.e., $(\dot{X},\dot{Y},\dot{Z})=(0,0,0)$, yielding F(X)=0, F(Y)=0 and F(Z)=0. Based on this and the restricted integer values of L and U, the number of scrolls in any direction d can be determined to be:

$$N_d=U_d-L_d+1=U_d+7, U_d \in [-4,3] \quad \text{EQN. 65}$$

Thus, the number of scrolls in any dimension ranges between 3 and 10 and is dependent only on the upper bound of the sawtooth nonlinear function in that dimension.

Attractors or phasor trajectory diagrams of the digital chaos generator output were generated to examine the chaotic output behavior of 1D, 2D and 3D multi-scroll systems. All systems exhibited excellent chaotic characteristics upon visual inspection. Since the digital implementations produces finite precision numerical solutions of what are infinite-precision continuous-time ODEs, the trajectories produced by the digital implementations are, by definition, pseudo-chaotic and approximate the chaotic behavior expected from analog systems. The pseudo-chaos can be verified by calculating the maximum Lyapunov exponent (MLE). The positive MLE of the digitally implemented multi-scroll systems indicates that the output is chaotic and unpredictable over the long term and thus is suitable to be implemented as pseudonoise for use in spread spectrum applications.

Discarding the highest significance bits greatly suppresses short-term predictability and enables the passage of all tests in the NIST SP. 800-22 statistical test suite. For example, the high 16 bits from each of the outputs X, Y and Z were discarded and the low 16 bits from X, Y and Z are concatenated to form a pseudonoise source for the tests. All three systems (1D, 2D and 3D) were implemented on a Xilinx Virtex 4 XC4VSX35-10FF668 FPGA (15,360 Slices, 30,720 LUTs, 30,720 FFs) and exhibited excellent statistical properties with experimentally verified throughput of up to 7.28 Gbits/S and LUT utilization not exceeding 1.25%, FF utilization not exceeding 0.45% and occupied slices not exceeding 1.61% of total resources available on the FPGA.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A digital circuit, comprising:
three digital state registers; and
three digital logic modules coupled to the three digital state registers, each of the three digital logic modules configured to:
obtain a plurality of first values from two or more digital state registers of the three digital state registers, where a first digital logic module of the three digital logic modules obtains two first values of the plurality of first values from two of the three digital state registers, where a second digital logic module of the three digital logic modules obtains two first values of the plurality of first values from two of the three digital state registers, and where a third digital logic module of the three digital logic modules obtains three first values of the plurality of first values from the three digital state registers;
determine a corresponding second value based upon the two or three first values obtained by that digital logic module and a chaotic differential equation; and
provide the corresponding second value as a respective input to set a state of a corresponding one of the three digital state registers;
where the three digital logic modules are configured to determine the corresponding second values according to a Runge-Kutta Fourth-order numerical solution, a mid-point numerical solution, or an Euler numerical solution to the chaotic differential equation.

2. The digital circuit of claim 1, further configured to generate a chaos shift key (CSK).

3. An apparatus comprising a first digital circuit of claim 1 configured to provide a first set of corresponding second values with a length of 16-bits and a second digital circuit of claim 1 configured to provide a second set of corresponding second values with a length of 32-bits.

4. The apparatus of claim 3, wherein a value of the first set of corresponding second values of the first digital circuit and a corresponding value of the second set of corresponding second values of the second digital circuit are combined to generate a single random output.

5. The digital circuit of claim 1, further comprising a post-processing module configured to combine the state of the three digital state registers to generate a single random output.

6. A digital circuit, comprising:
three digital state registers; and
three digital logic modules coupled to the three digital state registers, each of the three digital logic modules configured to:
obtain a plurality of first values from two or more digital state registers of the three digital state registers, where a first digital logic module of the three digital logic modules obtains two first values of the plurality of first values from two of the three digital state registers, where a second digital logic module of the three digital logic modules obtains two first values of the plurality of first values from two of the three digital state registers, and where a third digital logic module of the three digital logic modules obtains three first values of the plurality of first values from the three digital state registers;
determine a corresponding second value based upon the two or three first values obtained by that digital logic module and a chaotic differential equation, where the chaotic differential equation is a nonlinear jerk equation; and
provide the corresponding second value as a respective input to set a state of a corresponding one of the three digital state registers, where the corresponding second value determined by one of the three digital logic modules comprises a linear component provided to set the state of one of the two or more digital state registers and a nonlinear component provided to set a state of a fourth digital state register.

7. The digital circuit of claim 6, further comprising a post-processing module configured to discard a highest significant bit of at least one of the corresponding second values to generate a single random output.

8. The digital circuit of claim 7, wherein the post-processing module is further configured to discard a lowest significant bit of the at least one of the corresponding second values to generate the single random output.

9. The digital circuit of claim 6, wherein the three digital logic modules do not include multipliers.

10. A digital circuit, comprising:
three digital state registers; and
three digital logic modules coupled to the three digital state registers, each of the three digital logic modules configured to:
obtain a plurality of first values from two or more digital state registers of the three digital state registers, where a first digital logic module of the three digital logic modules obtains two first values of the plurality of first values from two of the three digital state registers, where a second digital logic module of the three digital logic modules obtains two first values of the plurality of first values from two of the three digital state registers, and where a third digital logic module of the three digital logic modules obtains three first values of the plurality of first values from the three digital state registers;
determine a corresponding second value based upon the two or three first values obtained by that digital logic module and a chaotic differential equation, where the three digital logic modules are configured to determine the corresponding second values using shift operations without multiplication operations, where all coefficients of the chaotic differential equation are a power of two; and
provide the corresponding second value as a respective input to set a state of a corresponding one of the three digital state registers.

11. The digital circuit of claim 10, wherein the three digital logic modules are configured to determine the corresponding second values according to a Runge-Kutta Fourth-order numerical solution to the chaotic differential equation.

12. The digital circuit of claim 10, wherein the three digital logic modules are configured to determine the corresponding second values according to a mid-point numerical solution to the chaotic differential equation.

13. The digital circuit of claim 10, wherein the three digital logic modules are configured to determine the corresponding second values according to an Euler numerical solution to the chaotic differential equation.

14. The digital circuit of claim 10, further comprising a post-processing module configured to combine the state of the three digital state registers to generate a single random output.

15. The digital circuit of claim 10, wherein the chaotic differential equation corresponds to a multi-scroll butterfly attractor.

16. The digital circuit of claim 10, wherein the chaotic differential equation corresponds to a multidimensional multi-scroll attractor.

17. A digital circuit, comprising:
a plurality of digital shift registers, each of the plurality of digital shift registers configured to obtain an input and provide an output;
a plurality of digital logic modules coupled to the plurality of digital shift registers, where the plurality of digital logic modules do not include multipliers, each of the plurality of digital logic modules configured to:
obtain outputs from a subset of two or more of the plurality of digital shift registers, where a first digital logic module of the plurality of digital logic modules obtains a first output from two of the plurality of digital shift registers, where a second digital logic module of the plurality of digital logic modules obtains a second output from two of the plurality of digital shift registers, and where a third digital logic module of the plurality of digital logic modules obtains a third output from three of the plurality of digital shift registers; and
provide the input for setting a state of at least one of the subset of two or more of the plurality of digital shift registers, the plurality of digital logic modules each configured to provide the input according to a portion of a numeric solution to a chaotic differential equation, the numeric solution based upon the outputs obtained by that digital logic module; and
a digital clock configured to provide a digital clock signal for operating the plurality of digital shift registers.

18. The digital circuit of claim 17, wherein the plurality of digital shift registers are each configured to provide the output to one or more of the plurality of digital logic modules on a first clock edge of the digital clock signal.

19. The digital circuit of claim 18, wherein the plurality of digital shift registers are each configured to obtain the input from one of the plurality of digital logic modules on a second clock edge of the digital clock signal.

20. The digital circuit of claim 17, further comprising a digital post-processing module configured to generate a chaotic output in response to the inputs received by each of the plurality of digital shift registers.

21. The digital circuit of claim 20, wherein the digital post-processing module is configured to discard a highest significant bit of at least one of the outputs from the subset of two or more of the plurality of digital shift registers to generate the chaotic output.

22. The digital circuit of claim 21, wherein the digital post-processing module is further configured to discard a lowest significant bit of at least one of the outputs from the subset of two or more of the plurality of digital shift registers based upon a distribution of bits in the outputs.

23. The digital circuit of claim 20, wherein the digital post-processing module is configured to combine the states of the plurality of digital shift registers to generate a single random output.

24. The digital circuit of claim 20, wherein the chaotic output is in a fixed-point number format.

25. The digital circuit of claim 17, further configured to generate an output that comprises a chaotic shift key (CSK).

26. A method, comprising:
receiving a clock signal having a first clock state and a second clock state;
obtaining, by each of a plurality of at least three digital logic modules, first values from a subset of a plurality of digital state registers when the clock signal enters the first clock state, where a first one of the plurality of at least three digital logic modules obtains two first values from two of the plurality of digital state registers, where a second one of the plurality of at least three digital logic modules obtains two first values from two of the plurality of digital state registers, and where at least a third one of the plurality of at least three digital logic modules obtains at least three first values from at least three of the plurality of digital state registers;
transforming the first values in each of the plurality of at least three digital logic modules into a corresponding second value based upon a numerical solution to one or more chaotic differential equations, where the one or more chaotic differential equations corresponds to a multi-scroll butterfly attractor;

writing the corresponding second values into a corresponding one of the plurality of digital state registers when the clock signal enters the second clock state; and providing a control signal to adjust parameters of the chaotic differential equations to modify the multi-scroll butterfly attractor.

27. The method of claim 26, further comprising providing at least one of the corresponding second values as a random number output.

28. The method of claim 27, further comprising discarding a highest significant bit of the at least one corresponding second value.

29. The method of claim 27, further comprising discarding a lowest significant bit of the at least one corresponding second value.

30. The method of claim 27, further comprising combining a plurality of the corresponding second values to form the random number output.

31. The method of claim 27, wherein the random number output comprises a fixed-point number.

* * * * *